Nov. 2, 1954
H. C. KENDALL ET AL
2,693,525
INDUCTIVE CONTROL SYSTEM
Filed Jan. 17, 1951
6 Sheets-Sheet 1
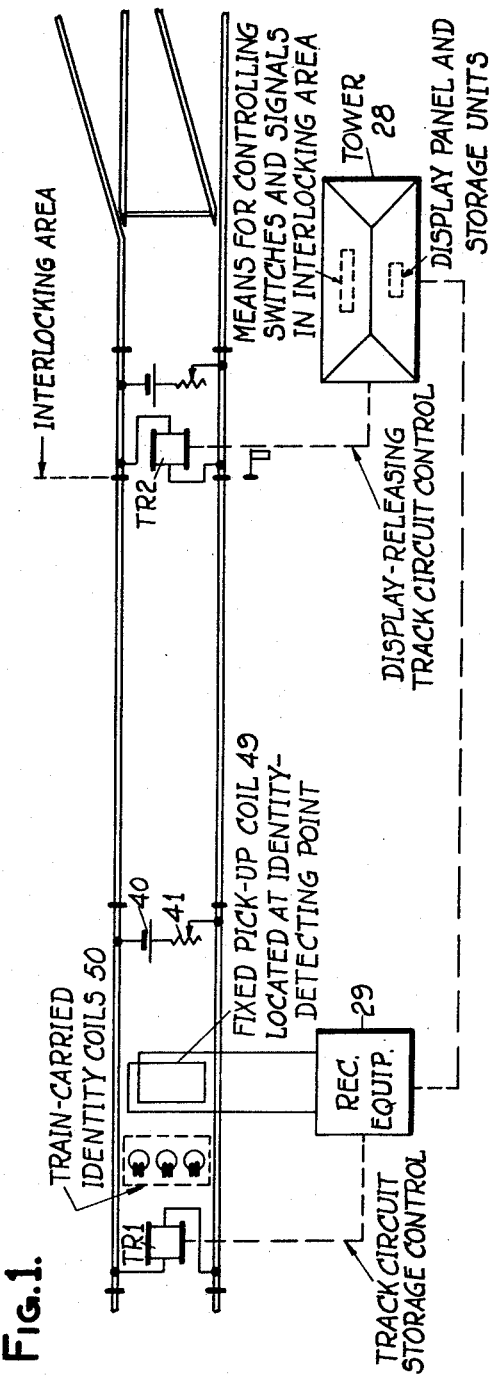
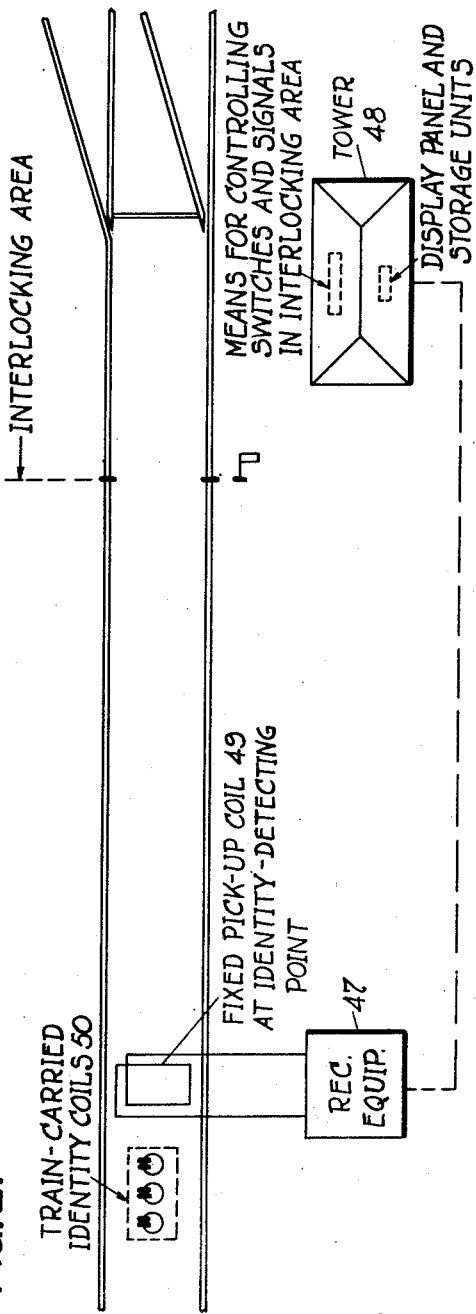
Inventors
H.C.Kendall and F.P.Zaffarano
By
Neil C. Preston,
Their Attorney

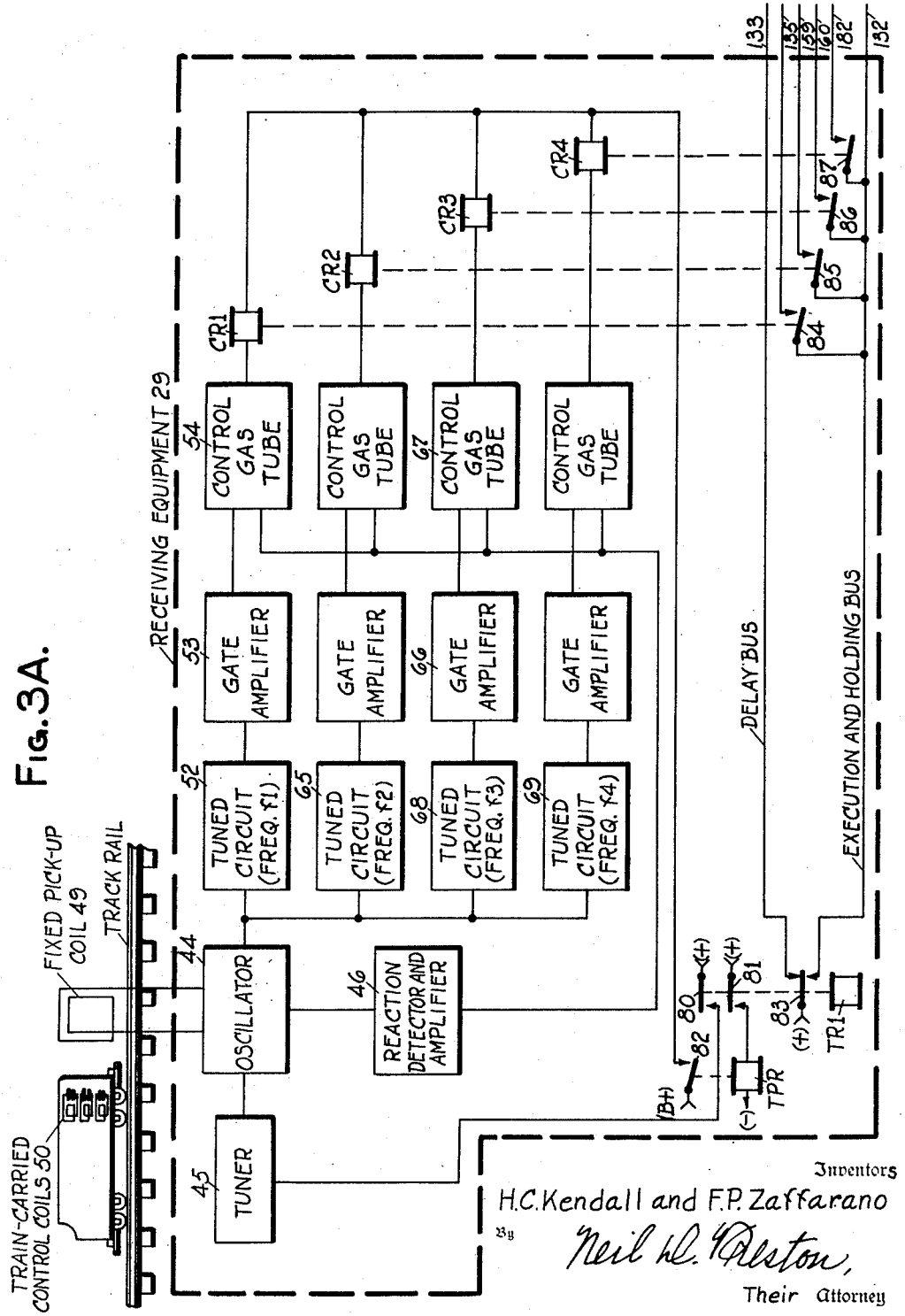

Nov. 2, 1954  H. C. KENDALL ET AL  2,693,525
INDUCTIVE CONTROL SYSTEM
Filed Jan. 17, 1951  6 Sheets-Sheet 3

Inventors
H.C. Kendall and F.P. Zaffarano
By Neil W. Preston,
Their Attorney

Inventors
H. C. Kendall and F. P. Zaffarano

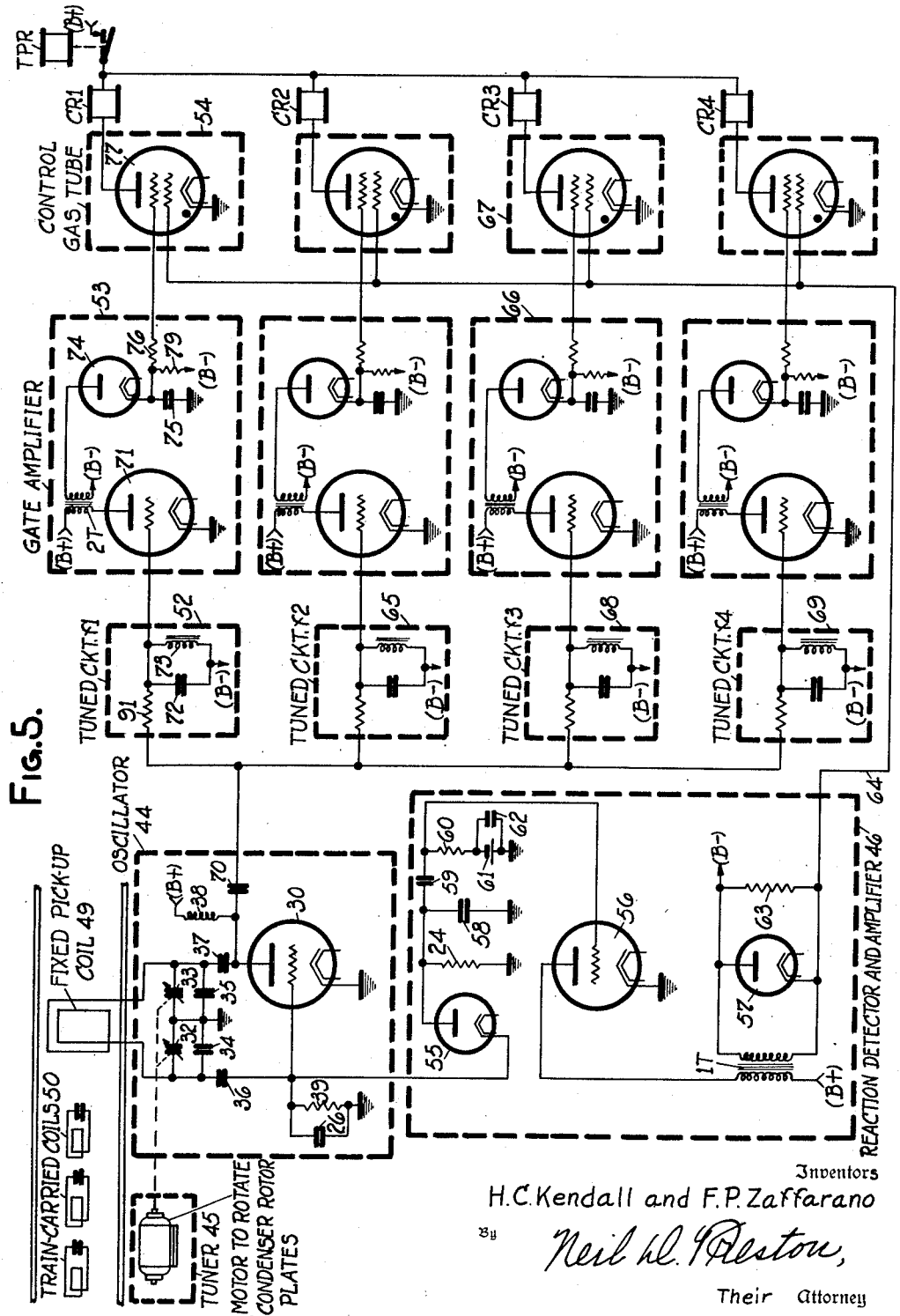

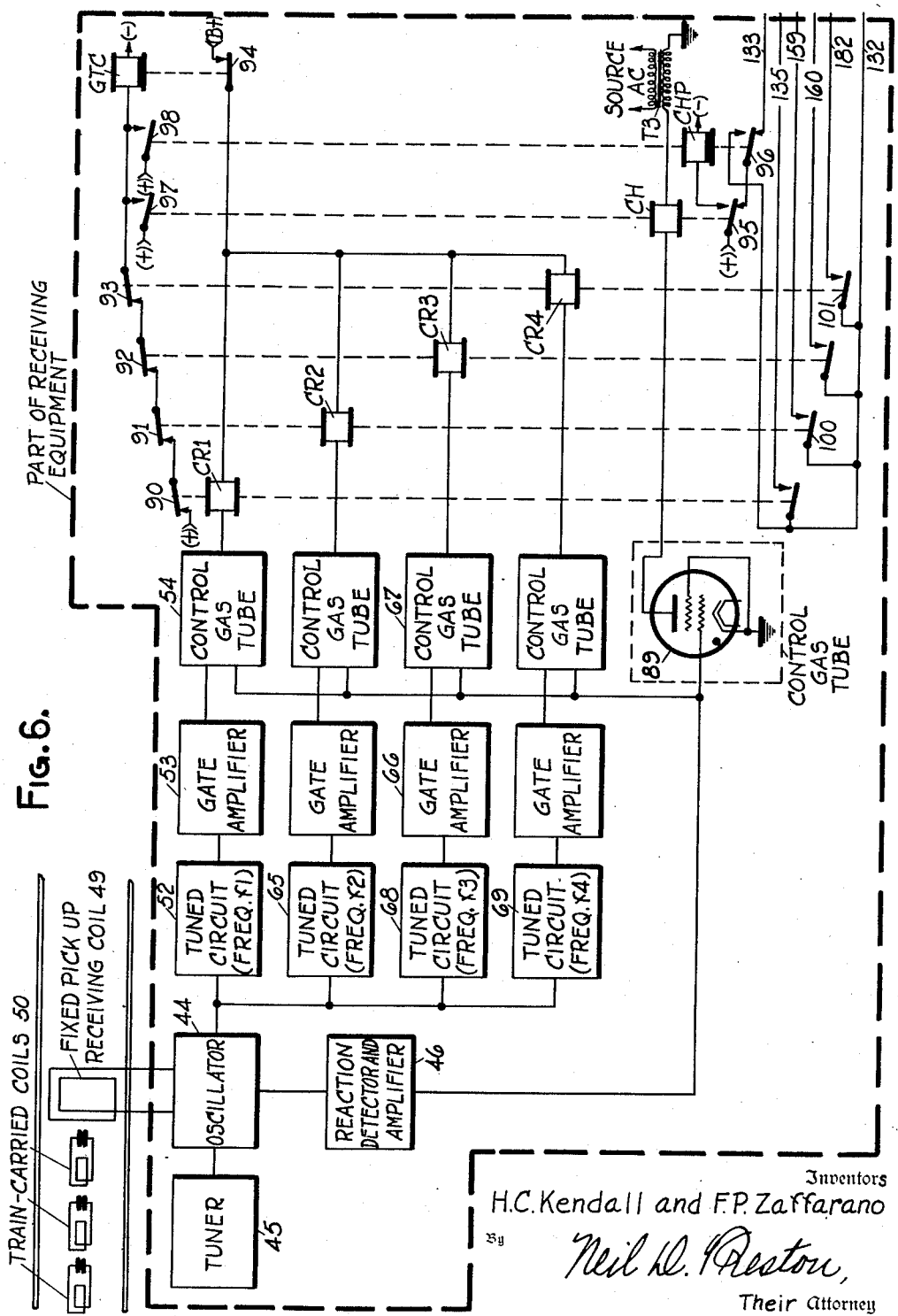

United States Patent Office 2,693,525
Patented Nov. 2, 1954

2,693,525

INDUCTIVE CONTROL SYSTEM

Hugh C. Kendall and Frank P. Zaffarano, Rochester, N. Y., assignors to General Railway Signal Company, Rochester, N. Y.

Application January 17, 1951, Serial No. 206,395

21 Claims. (Cl. 246—124)

This invention relates to systems for communicating information between moving vehicles and fixed wayside locations, and more particularly pertains to such systems in which the information is transferred inductively.

To obtain the most expeditious handling of railway traffic, it is frequently desirable to provide for the communication of information between moving trains and fixed wayside locations, for example, as in train control systems, and train describer systems. Although the present invention might well be applied to either of such systems, for the purposes of this disclosure, it has been shown as providing for the transfer of train identities as they pass fixed wayside locations in a train describer system. Such a system is particularly useful when employed at the approach to an interlocking area where advance information as to the identity of trains facilitates the setting up of routes for such trains. The present invention more particularly pertains to the characteristics of the system for communicating the identity information between the trains and the wayside with such information being employed in any suitable way to provide a visual indication upon a display board at some convenient location of the identity of each of the trains and their order as they pass the identity detecting point.

In certain prior art systems, the transfer of information between a train and a wayside location is effected inductively by providing a pick up coil which is energized with alternating current at some selected frequency, in combination with a control coil which is tuned to the same frequency and so located that it will be inductively coupled to the pick up coil as the train passes the control location. In an organization of this kind, the passage of the control coil causes an effect upon the pick up coil to increase the load upon the associated apparatus. The detection of this change in load on the pick up or receiving apparatus is then used to control the indication means. The inherent difficulty in the prior systems of this kind is that metallic objects passing in proximity to the pick up coil produce a loading effect on the receiving apparatus similar to that of a control coil. As a result, the passage of a control coil through the field of the receiving coil can be distinguished from the movement of a metal object through the same field only by the difference in magnitude of the loading effect. In other words, the operation of such a system is based upon the premise that a resonant coil will produce a greater loading effect than a metallic object. However, since the degree of coupling may vary over quite a range, it may readily happen that the passage of a metallic object will produce a spurious response.

In view of the above considerations, it is proposed in accordance with the present invention to provide an organization for the inductive transfer of information in such a manner that the effect upon the receiving apparatus by the presence of a resonant control coil is many times greater than the effect produced by the passage of metallic objects under the most favorable coupling conditions. It is proposed that this be accomplished by the provision of an organization in which the receiving coil is energized by alternating current varying over a range of frequencies which range includes the frequency of the resonated control coil. In this way, it is possible to provide a more distinctive change of the loading effect upon the receiving coil while it is coupled to the control coil. In addition, it is proposed that apparatus be connected to the pick up or receiving coil which is responsive to the rate of change of the loading effect rather than to the actual value of the change as the control coil passes within proximity.

In the embodiment of the present invention, it is proposed that the band of frequencies to which the control coil is resonant is preferably made rather narrow and the repetition rate of sweeping the range of frequencies applied to the receiving coil is made rather rapid, so that the composite result upon the receiving coil during the passage of a control coil is to cause the change in loading effect to take place at a rate which is many times greater than the rate of change of the loading effect during the passage of metallic objects. In this way, the present invention proposes to provide a positive inductive control which is free from spurious operation due to the passage of metallic objects through the field of the receiving or pick up coil.

In prior art systems in which the absolute value of loading change on the receiving coil must be effective to give the indication as distinctive from the absolute value of any change in loading effect from the passing of a metallic object, it is obviously necessary to maintain the frequency of the pick up or receiving coil within a relatively narrow limit so that it will coincide with the resonant frequency of the control coil. This requirement is present because a pronounced loading effect on the receiving coil can occur only when the frequency of resonance of the control coil is substantially the same as the frequency of energization of the receiving coil. Thus, another object of the present invention may be said to be the provision of a system which is not subject to strict maintenance of the applied frequency, since the sweeping through a band of frequencies assures the inclusion of the particular frequency to which the control coil is tuned.

The present invention further proposes to provide a system of considerable capacity by having a number of control coils tuned to different frequencies which are included within the sweep of frequencies of the pick up or receiving coil. In this way, the system is simplified in that only one receiving coil is required regardless of the number of control coils employed. Therefore, another object of this invention is to provide an organization permitting the use of a plurality of different or distinctive controls and yet requiring a minimum of apparatus.

Other objects, purposes, and characteristic features of the present invention will be in part obvious from the accompanying drawings and in part pointed out as the description of the invention progresses.

In describing the invention in detail, reference will be made to the accompanying drawings in which like reference characters designate corresponding parts throughout the several views, and in which:

Fig. 1 illustrates the general organization of an embodiment of this invention for use where track circuit control is employed in cooperation with the wayside apparatus;

Fig. 2 illustrates the general organization of another embodiment of this invention to be used where track circuit control is not employed;

Figure 3B:
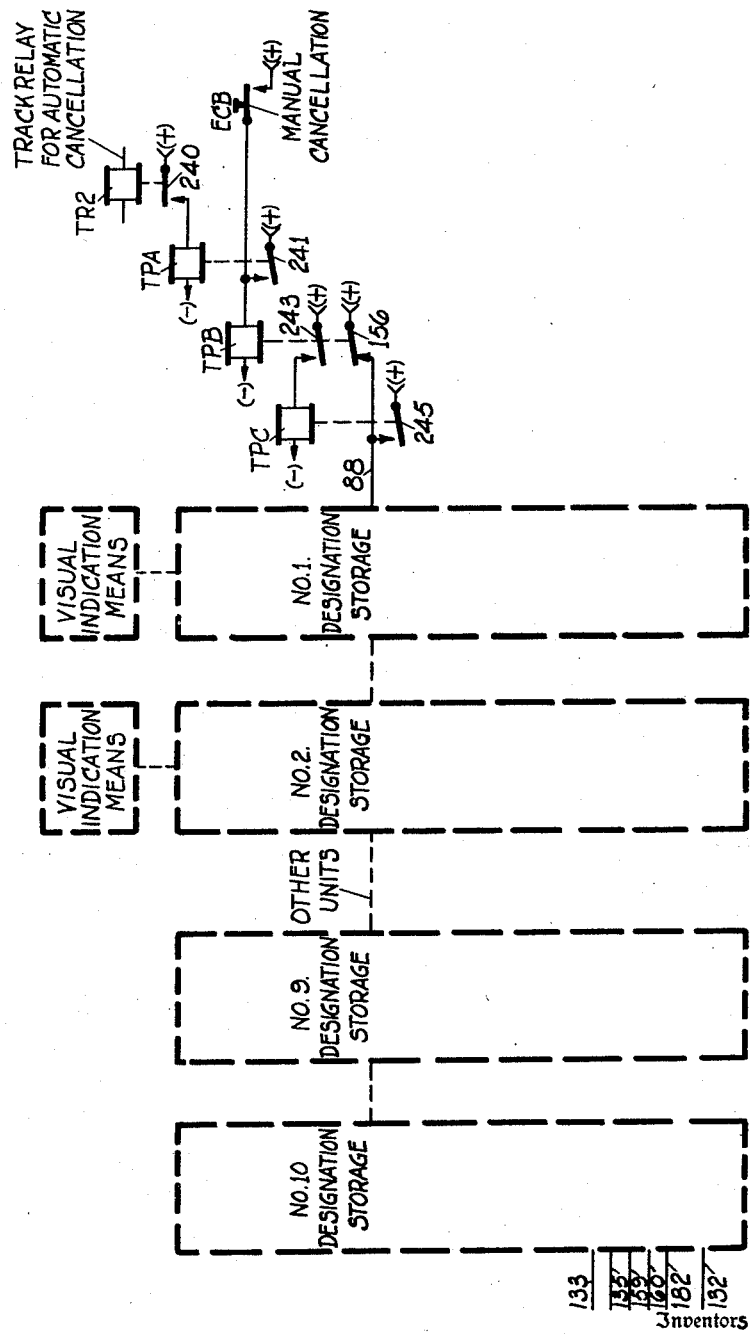
Figure 4A:
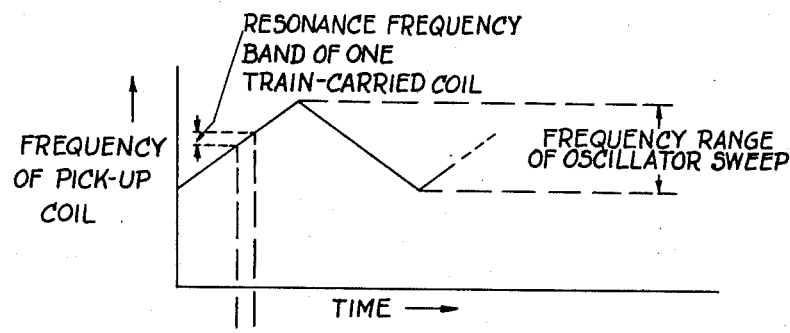
Figure 4B:
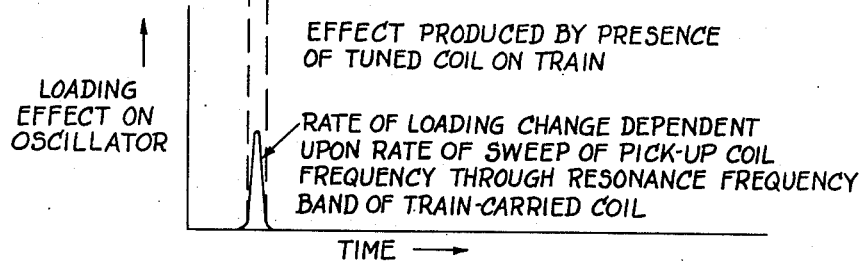
Figure 4C:
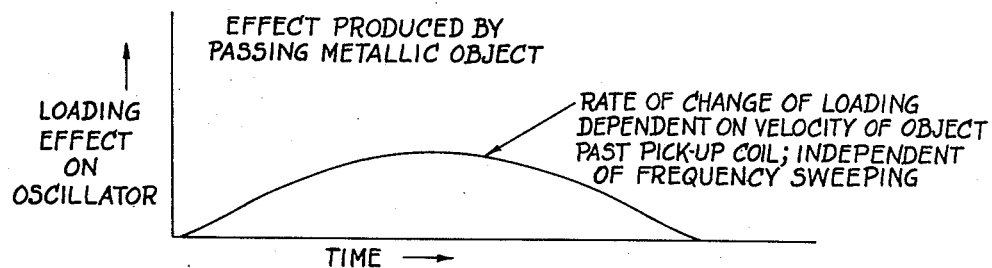

Figs. 3A and 3B, when placed side by side, illustrate in block form the circuit organization of the embodiment shown diagrammatically in Fig. 1;

Figs. 4A, 4B, and 4C include curves illustrating graphically certain advantages of the present invention;

Fig. 5 is a circuit drawing showing in detail the receiving apparatus shown in block form in Figs. 1 and 3A;

Figs. 6 and 3B, when placed side by side, show the alternative embodiment diagrammatically illustrated in Fig. 2 and, in particular, illustrate the required modifications in the circuit drawing of Fig. 5 to provide the circuit organization of this embodiment.

To simplify the illustration and facilitate in the explanation, the various parts and circuits constituting the embodiment of this invention have been shown diagrammatically and certain conventional illustrations have been used. The drawings have been made with the purpose of making it easy to understand the principles and mode of operation rather than with the idea of illustrating the specific construction and arrangement of parts that would be employed in practice. The various relays and their contacts are illustrated in a conventional manner, and the symbols (+) and (—) associated with arrow tails and heads, respectively, indicate connections to the opposite terminals of a source of power of suitably low voltage for the operation of the various relays. The symbols (B+) and (B—) indicate connections to the positive and negative terminals respectively of a source of power of suitably high potential as required for the operation of various electronic tubes and the like and the symbol for ground represents a potential at some suitable level between that of (B+) and (B—).

General organization

Fig. 1 shows diagrammatically the organization of one embodiment of this invention. This drawing illustrates a portion of railroad track in approach to an interlocking area. A tower 28 which may be located near the entrance to the interlocking area includes means enabling an operator to remotely control the switches and signals in the interlocking area so that a proper route may be established for each train as it enters the area. The tower also includes a display panel and designation storage units which cooperate to provide a visual display of train identities for the various trains, thereby greatly facilitating the setting up of a route by the operator for each train prior to its entrance into the interlocking area. At a selected distance in approach of the interlocking area is a track circuit energized by the track battery 40 which supplies current to the track rails at the exit end of the track section through a variable current limiting resistor 41. The track relay TR1 is connected across the track rails at the entrance end of the track section and is, therefore, normally energized. The receiving equipment 29 including the fixed pick-up or receiving coil 49 is located adjacent the track rails within the confines of the track section.

Each train approaching the interlocking area has mounted upon it one or more tuned coils 50, each resonant to a different frequency. Each train-carried identity or control coil may comprise a number of turns of wire with a tuning condenser shunting the coil as diagrammatically illustrated in Fig. 1. The pick-up or receiving coil may include a plurality of turns with opposite ends of the coil winding connected to the receiving equipment 29. The fixed pick-up coil and the train-carried coils 50 on each train are so mounted relative to each other that they will be brought into a suitably close inductive relationship as the train passes the identity-detecting point. One possible manner of positioning the train-carried control coils and the pick-up coil is shown in Fig. 1. In this drawing, the pick-up coil is shown mounted at a suitable distance above the track with its plane horizontally disposed. The train-carried control coils are then mounted upon the roof of the train in a horizontal plane so that they will simultaneously pass the pick-up coil. In Fig. 2, the pick-up coil is mounted in the same way as in Fig. 1 but now the train-carried coils are shown mounted in such a manner that they pass the pick-up coil in succession. As still another possibility, Fig. 3A shows the pick-up coil mounted with its plane vertically disposed and alongside the track. The train-carried coils are then located on the side of the train, either one above the other or horizontally in line.

Regardless of the manner of mounting the train-carried control coils, they should preferably be mounted with a sufficient distance between coils to prevent any coil from affecting an adjacent coil. It has been found, for example, that when coils of eighteen inch diameters are used, adjacent coils should preferably be separated by approximately four inches, assuming, of course, that all the train-carried coils are in the same plane.

When a train enters the track section adjacent the train identifying point and causes track relay TR1 to be dropped away, the receiving equipment 29 becomes conditioned to respond to a distinctive control that is transferred, by means of the train-carried control coils 50 and through the pick-up receiving coil 49 to the receiving equipment. The particular combination of resonance frequencies of the train-carried coils determines the identity of the corresponding train. More specifically, the receiving equipment 29 includes an oscillator which sweeps the frequency of the energization applied to the pick-up coil 49 over a selected range of frequencies. Each of the control coils is resonant to a different frequency which is included in the range of frequencies swept by the oscillator. During the time that each train-carried coil is within the magnetic field of the pick-up coil, the frequency of the energization applied to the pick-up coil passes through the resonant frequency of the coil on the train. As a result, current circulates in the train-carried coil to produce thereby what is known as a loading effect on the oscillator.

The receiving equipment also includes a plurality of control responsive relays, one for each different resonant coil. The receiving equipment is organized to detect the loading effect on the oscillator and causes the selective energization of the control responsive relays, with the particular relay energized dependent upon the oscillator frequency at the instant the loading effect occurs and thus dependent, in turn, upon the resonant frequency of the coil producing the loading effect. The selective picking up of the control responsive relays as the train-carried coils pass the pick-up coil constitutes a code designating some particular train identity. As the train leaves this track section so that track relay TR1 can again be picked up, the identity information in the receiving equipment 29 is transferred to the designation storage units and display panel within the tower 28. A sufficient number of designation storage units must be included to store a number of train identities corresponding to the largest number of trains that may be travelling at any one time between the identity pick up point and the point where the identities are used and cancelled.

When the identity information has been transferred out of the receiving equipment 29, this apparatus is restored to its normal condition so that it can again be operated by a following train.

As the train enters into the interlocking area, the route for that train has presumably already been set up in accordance with the identity of the train so that its information need no longer be stored in a designation storage unit. For this reason, an additional track circuit may be included within the interlocking area, such as the track circuit including the track relay TR2 which drops away when the train enters the interlocking area; and the release of this relay TR2 is then effective to cancel the description of such train from the display panel. The designation storage units and their associated apparatus are so organized that the cancellation of the train identity stored in the first storage unit causes each of the remaining stored identities to be advanced into the next respective storage unit. Thus, the identity of the train which is first in approach to the interlocking area is always stored in the first designation storage unit.

In the embodiment of Fig. 2, track circuit control is not used. The receiving equipment 47 including the fixed pick-up coil 49 is located at a suitable distance in approach of the interlocking area. As the train-carried control coils 50 move into proximity with the fixed pick-up coil, the apparatus included in the receiving equipment 47 is distinctively controlled in accordance with the resonant frequencies of the train-carried coils and this identity information is then transferred to the designation storage units and display panel in the tower 48. The conditioning of the receiving equipment 47 and the cancelling of train identities described in connection with the embodiment of Fig. 1 is obtained in this embodiment as a result of modifications in the receiving equipment as will later be described in connection with Fig. 6.

Figs. 3A and 3B illustrate in block form the embodiment of the invention shown diagrammatically in Fig. 1. Fig. 3A again shows the fixed pick-up coil 49 mounted adjacent the trackway and connected to the oscillator 44 included in the receiving equipment. The train-carried control coils 50 are so mounted upon the train that they will simultaneously pass in inductive relationship to the pick-up or receiving coil 49, as already described.

The pick-up coil 49 is energized by the oscillator 44 which is in turn, controlled by the tuner 45. The tuner 45 may be of either a mechanical or an electrical type; its purpose is to vary the output frequency of the oscillator 44 over a selected range and at a relatively rapid rate. The oscillator 44 may be of any suitable type and may be adjusted to operate over any selected range of radio frequencies. In one embodiment of this invention, the oscillator 44 was adapted to operate over the range of frequencies from 140 to 180 kc. The tuner 45 must shift the frequency of oscillator 44 at a sufficiently rapid rate to ensure that the frequency will be varied over its entire range during the relatively short time that a coil, mounted on a train travelling at maximum speed, remains within effective coupling relationship with the pick-up coil. In one embodiment of this invention, it was found feasible to have the tuner and oscillator cooperate to vary the oscillator frequency at a rate of sixty cycles per second, i. e. the oscillator frequency varies from its lowest to its highest value and back again to its lowest value sixty times per second.

When a tuned, train-carried control coil 50 is moved into an inductive relationship to the fixed pick-up or receiving coil 49, there is substantially no effect upon the wayside equipment as long as the frequency of the energization applied to the pick-up coil differs distinctly from the resonant frequency of the train-carried coil. However, the oscillator frequency is shifted at a sufficiently rapid rate to ensure that the frequency of energization of the fixed pick-up coil 49 will sweep through the resonant frequency of each train-carried coil at least once even at maximum train speed. As the frequency at which the pick-up coil 49 is energized approaches the resonant frequency of the train-carried coil 50, the voltage induced in the train-carried coil causes a circulating current in such coil, and this circulating current reaches its maximum value when the pick-up coil is energized at the resonant frequency of the train-carried coil. With a circulating current passing through the resonant circuit of the train-carried coil 50, power must be supplied from the pick-up coil 49 and this transfer of power from the pick-up coil causes a decrease in the amplitude of the oscillations provided by the oscillator 44. Thus, the oscillator may be said to be said to be 'loaded" during the time that it is energized at the resonant frequency of the train-carried control coil.

The frequency of the oscillator shifts at such a rapid rate that the fixed pick-up coil is energized at the resonant frequency of any train-carried coil for only a brief instant. Therefore, as the frequency of energization of the fixed pick-up coil sweeps past the resonant frequency of a train-carried coil, the loading effect is only momentary. The manner in which the oscillator frequency as applied to the pick-up coil varies as a function of time is graphically illustrated in Fig. 4A. Although the frequency is shown as varying linearly, this is not a requirement as it is only necessary that the frequency be swept at a relatively rapid rate between the selected values. If the resultant loading effect produced on the oscillator by a tuned coil is plotted as a function of time, the result will appear somewhat as shown in Fig. 4B. The range of frequencies for which a particular tuned control coil exhibits the properties of resonance is indicated by legend and dotted lines in Fig. 4A. The time required for the oscillator frequency to sweep over this frequency range is thus the same length of time (indicated by projection of dotted lines on Fig. 4B) that the loading effect on the oscillator is apparent. The relatively short duration of the loading effect is caused entirely by the fact that the oscillator frequency sweeps rapidly past the resonant frequency of the train-carried coil so that only for a brief instant is the voltage induced in the train-carried coil at that frequency which will cause a circulating current in such coil.

The loading effect is made evident on the oscillator by a reduction in amplitude of the oscillations provided by the oscillator 44. As will later be described in somewhat greater detail, this reduction in amplitude of the oscillations is also accompanied by a reduction of grid bias of the electron tube 30 included in the oscillator 44 (shown in Fig. 5). The receiving equipment 29 includes a reaction detector and amplifier 46 which is controlled by these combined effects on the oscillator when loaded as described to provide a distinctive output, thereby providing a positive indication that a tuned control coil is within coupling range of the fixed pick-up coil.

When a relatively large number of distinct train identities must be provided for, both the wayside and the train-carried equipment may be simplified by using a coding arrangement. The receiving equipment 29 may include a plurality of control responsive relays each of which can be controlled from its normal condition when a corresponding train-carried control coil, tuned to a particular frequency, is moved into an inductive relationship with the fixed pick-up coil 49. With one or more tuned coils on each train, the passage of a train past the identity-detecting point causes one or more corresponding control responsive relays to be controlled to their opposite conditions. The particular combination of conditions for the total of the control responsive relays then determines the identity of the train that has passed the identity-detecting point. For example, the receiving equipment may include four control responsive relays as shown in Fig. 3A. Each relay can be operated from its normal condition only as a corresponding train-carried coil having a particular resonant frequency passes the fixed pick-up coil. With each train carrying one or more tuned coils, one or more of the respective control responsive relays is actuated as each train passes the identity-detecting point. Since each of the four control responsive relays may be controlled to either of two distinctive conditions for each separate identity, a maximum of 24 or 16 different combinations of pick up and drop away of these four relays can result. In the embodiments of the invention described here, all the four control responsive relays, CR1, CR2, CR3, and CR4 are normally dropped away as shown in Figs. 3A and 6. If the particular combination of relay conditions calling for the pick up of all four control responsive relays is not used, no train need carry more than three tuned control coils. Thus, by not using in the code system those combinations of relay conditions calling for all the control responsive relays to be picked up and the normal condition wherein all these relays are dropped away, a maximum of 14 distinct identities can be utilized using the four control responsive relays and but one to three resonant coils on each train. Although a maximum of three resonant coils is to be used on any one train, it should be understood that the resonance frequencies of the various coils are chosen from among four different frequencies.

As already described, a distinctive signal is supplied by the reaction detector and amplifier 46 as the oscillator frequency sweeps through the resonant frequency of any train-carried control coil that is then in an inductive relationship with the fixed pick-up coil 49. The occurrence of this distinctive signal does not provide an indication, however, of the resonant frequency of the coil whose presence is the cause of such distinctive signal. Thus, this signal cannot, of itself, be used to control a corresponding control responsive relay. The receiving equipment 29 (Fig. 1) includes a plurality of tuned circuits, and it is the function of these tuned circuits to cooperate with the rest of the receiving equipment to provide a distinctive signal as the oscillator frequency sweeps through the resonance frequency of each train-carried control coil.

These distinctive signals might well be termed frequency sweep position signals, since a distinctive signal is given for each of the different positions of the sweep used for control purposes. Thus, the occurrence of an output from the reaction detector and amplifier 46 in coincidence with a particular one of the sweep position signals provides means for identifying the resonant frequency of that particular control coil causing the output and in this way provides a means for selecting the proper control responsive relay for energization corresponding to that particular control coil.

More specifically, the tuned circuit elements 52, 65, 68 and 69 are respectively resonant at the various resonance frequencies of the train-carried control coils 50. Thus, if the use of four distinct resonance frequencies for the train-carried control coils is contemplated, the receiving equipment also includes four tuned circuits respectively resonant to these four distinct frequencies. The output of the oscillator 44 is applied to the input of each tuned circuit as shown in Fig. 3A and the output of each tuned circuit controls a corresponding gate amplifier (such as 53) which, in turn, controls a corresponding control gas tube (such as 54). Associated with each control gas tube is a control responsive relay.

As the oscillator frequency is swept over the resonant frequency of any of the tuned circuit elements, that tuned circuit provides a distinctive output to its associated gate amplifier, but when the oscillator frequency is of a substantially different value than the resonant frequency of the tuned circuit, that tuned circuit does not provide a distinctive voltage to its associated gate amplifier. Thus, the application of a distinctive output from any tuned circuit to its corresponding gate amplifier is a positive indication that the oscillator is operating at that instant at the frequency for which the tuned circuit is resonant and also at one of the plurality of resonance frequencies to which the various train-carried coils are tuned. For example, assuming that the pick-up coil 49 and a train-carried control coil 50 resonant to a frequency $f1$ are in an inductive relationship, the loading effect on the oscillator as its frequency sweeps through the frequency $f1$ causes a distinctive signal to be supplied by the reaction detector and amplifier 46 to all of the control gas tubes. At the same time, the oscillator output, as its frequency sweeps through $f1$ causes the tuned circuit 52 (see Fig. 3A), which is also resonant to frequency $f1$, to supply a disinctive output to the gate amplifier 53. This gate amplifier then, in turn, supplies a distinctive control voltage to the control gas tube 54 coincident with the output of detector 46. The distinctive voltage obtained from the reaction detector and amplifier 46 merely indicates that the oscillator frequency has swept through the resonant frequency of some train-carried control coil with which it is inductively related. The control voltage applied contemporaneously to gas tube 54 through the tuned circuit 52 and gate amplifier 53 indicates that such resonant train-carried control coil frequency must be frequency $f1$ and this control voltage is, therefore, applied as a gating potential only to control gas tube 54. With both the distinctive signal from the reaction detector and amplifier 46 (applied to all of the control gas tubes) and the gating potential from gate amplifier 53 applied only to control gas tube 54, this tube 54 is made conductive so as to energize the corresponding control responsive relay CR1.

The gating control applied by each gate amplifier to its associated control gas tube is thus applied each time that the oscillator frequency is swept over its operating range and is independent of the presence of any train-carried coil. As the oscillator frequency varies over its range, the various control gas tubes are successively gated, each by its associated gate amplifier. If a train-carried control coil, resonant to frequency $f3$, for example, enters the magnetic field of the pick-up coil, the oscillator frequency in sweeping through $f3$ causes the tuned circuit 68 again to supply a distinctive voltage to the gate amplifier 66. As a result, a gating control is again applied to control gas tube 67 as happens every time that the oscillator frequency sweeps through the value $f3$. This time, however, the inductively coupled train-carried coil tuned to frequency $f3$ causes a distinctive output to be supplied to each control gas tube. This distinctive output is effective only on control gas tube 67 since this gas tube is the only one now provided with a gate control from its associated gate amplifier. Consequently, control responsive relay CR3 is energized to its picked up condition. Each of the control responsive relays is controlled in a similar manner as the corresponding train-carried control coil is brought into the magnetic field of the pick-up coil 49.

The train describer system of the present invention is so organized that the receiving equipment can readily distinguish between the passage of a train-carried coil and a metallic object. This feature guards against the possibility that metallic objects on the train will falsely produce a response on the receiving equipment and thus cause an incorrect train identity to be established.

When a metallic object moves into the coupling range of the fixed pick-up coil 49, a detuning effect upon the pick-up coil is produced. The reason for this detuning effect is that a voltage is induced in the metallic object causing eddy currents to flow therein. The result is that the object acts as a shorted turn upon the pick-up coil so as to change its effective impedance. It is believed that the difference in inductance of the magnetic circuit caused by the passage of a piece of ferromagnetic material is small because of the relatively large air gaps in the circuit. Thus, the primary factors affecting the loading effect upon the pick-up coil produced by a passing metallic object are the size and proximity of such object and its electrical conductance since the conductance directly affects the magnitude of the eddy currents. Thus, in all cases, the presence of a metallic object (regardless of its composition) may cause a change in the load on the oscillator 49 as it moves into and leaves the effective coupling field of the pick-up coil 49. However, this change in the load on the oscillator 44 is relatively slow as compared to the change in load which takes place during the sweep of the oscillator frequency through the resonant frequency of an adjacent control coil 50. This is true even though the metal object is moving at the speed of the fastest trains by reason of the fact that in comparison the frequency sweep caused by the tuner 45 is at a rather rapid rate and also due to the fact that the width of the band of frequencies allotted to each control coil is relatively narrow. In addition, the amplitude of the change in loading effect due to the presence of a resonant control coil is usually relatively great as compared to the affect on the amplitude of oscillations due to the presence of a metallic object. In brief, these different conditions all contribute to a very distinctive condition under the presence of a control coil as compared to the presence of a metal object as will be discussed in greater detail presently.

When a metallic object is brought into the magnetic field of the pick-up coil, the magnitude of the loading effect is substantially independent of the oscillator frequency. The magnitude of the loading effect caused by a metallic object is dependent instead upon the degree of coupling between the object and the pick-up coil with the loading effect being, in general, a maximum when the two are closest together. Consequently, the rate at which the loading effect is varied when a metallic object passes through the field of the pick-up coil is dependent entirely upon the relative velocity between the object and the pick-up coil with the loading effect increasing toward a maximum as the two are brought closer together and then decreasing again toward zero as the metallic object leaves the field of the pick-up coil. This variation in loading effect is shown graphically in Fig. 40. The result obtained contrasts markedly with that obtained when the oscillator loading occurs as a result of the presence of a tuned control coil 50. When a tuned coil enters the magnetic field of the pick-up coil, the loading effect upon the oscillator is substantially unaffected by any relative movement between the train-carried coil and the fixed pick-up coil. Thus, the loading effect abruptly increases from zero toward some maximum value as the oscillator frequency is swept toward the resonant frequency of the tuned coil and again abruptly decrease to zero as the frequency of the oscillator is further shifted beyond the resonance frequency of the tuned coil. As already described, this variation of the loading effect is as shown graphically in Fig. 4B, and this condition is obtained even if the train-carried coil is motionless with respect to the fixed pick-up coil.

The reaction detector and amplifier 46 operates, as has already been stated, to provide a distinctive output when a change in the loading effect upon the oscillator takes place. Since the change in loading upon the oscillator is made evident by the change in amplitude of the oscillations and by a change of grid bias of the oscillator tube, the reaction detector and amplifier has been adapted to be responsive to these voltage changes and thus provide an indication of the fact that the frequency of energization of the pick-up coil is sweeping through the resonant frequency of a train-carried coil with which it is magnetically coupled. To provide a ready distinction between the effects produced by a tuned coil and a metallic object, the reaction detector and amplifier 46 is so constructed that it responds only to relatively rapid changes in the loading effect upon the oscillator, i. e., it responds only to rapid changes in the amplitude of the oscillations and in the amplitude of the grid bias applies to the oscillator tube. Relatively slow changes in the oscillator loading effect, i. e. a low rate of change of the grid bias and amplitude of the oscillations, do not cause the reaction detector and amplifier to produce a suitably distinctive output. Thus, when the loading effect is due to the presence of a tuned circuit and increases and decreases abruptly as shown in Fig. 4B, a distinctive output is supplied; but, when the loading effect increases and decreases at a substantially slower rate as is caused by the passage of a metallic object as shown in Fig. 4C, no suitably distinctive output is provided by the reaction detector and amplifier 46.

*Description of detailed circuits*

Fig. 5 shows the detailed circuits of the receiving equipment 29 shown in block form in Fig. 1 and diagrammatically in Fig. 3A. More specifically, the circuit organization of Fig. 5 illustrates that portion of the receiving equipment directly involved in the selective energization of the various control responsive relays as a train passes the identity detecting point.

The apparatus of Fig. 5 includes a radio-frequency oscillator comprising tube 30 and a tuned circuit including the fixed pick-up coil 49 and condensers 32, 33, 34 and 35. Condensers 34 and 35 are fixed condensers connected in series across the wayside loop 49 and with their junction connected to ground. Variable condensers 32 and 33 are connected in parallel with the condensers 34 and 35 respectively and the junction of these condensers 32 and 33 is also connected to ground. As already described, the purpose of the tuner 45 is to vary the frequency of oscillations of the oscillator 44 at a relatively rapid rate. In Fig. 5, the tuner is shown as comprising a motor which rotates the rotor plates of the variable condensers 32 and 33 with respect to the stator plates thereof so as to vary the capacitance of these condensers at a rate determined by the speed of the motor. The result is that the total capacitance shunting the wayside loop 49 is continually variable as long as the motor included in the tuner 45 rotates. This variation in capacitance constantly changes the frequency at which the oscillator tuned circuit, including pick-up coil 49 and the various condensers 32, 33, 34, 35, is resonant thereby shifting the oscillator frequency accordingly. Although a motor has been shown as included in the tuner to vary the oscillator frequency, other means, electrical or mechanical, might also well be used to accomplish this purpose.

The two terminals of the fixed pick-up coil 49 are connected through coupling condensers 36 and 37 to the control grid and plate respectively of the oscillator tube 30. The plate of this tube is provided with a direct-current potential by its connection through the radio-frequency choke coil 38 to the (B+) voltage source. Grid leak bias for tube 30 is obtained by the connection of its control grid through the grid leak resistor 39 to ground. This latter resistor is shunted by a condenser 26 to provide some bypassing action for the resistor 39. Condenser 26 is chosen to have sufficient capacitance with respect to condenser 36 to provide a proper level of grid voltage for tube 30. In this connection, it has been found that reduction of the grid input signal to the oscillator tube by causing condenser 26 to have sufficient capacitance causes the oscillator to be more susceptible to loading effects produced by a tuned coil. Otherwise, with a very high value of grid voltage, the oscillations are reduced to a lesser degree when the oscillator is loaded. Although the oscillator shown in Fig. 5 is of the general form commonly referred to as a Colpitts oscillator, other kinds of oscillators may also be used; and the specific form of oscillator shown is intended only to provide a definite disclosure of an embodiment of this invention.

The capacitance of the condensers 32 and 33 is varied at a sufficiently fast rate, as already described, to enable the oscillator 44 to operate over its entire range of frequencies during the minimum time that any of the train-carried coils is in an inductive relationship to the wayside coil 49. The amount of shift of the oscillator frequency must be such as to cause the oscillator to oscillate successively at all the frequencies for which the various train-carried control coils are resonant. In one embodiment of this invention, this range of frequencies was chosen, by way of illustration, to be from 140 to 180 kc.

Under normal conditions, when there are no train-carried coils in an inductive relationship to the fixed pick-up coil 49, the oscillator 44 repeatedly scans over its range of frequencies as determined by the variation in capacitance of the motor-driven variable condensers 32 and 33, and a substantial negative bias voltage is developed at the grid of tube 30 by the rectification of grid current which occurs when the grid of this tube is driven positive on the peaks of the positive half cycles. When a train-carried coil is moved into inductive relationship with the fixed pick-up coil, there is no effect on the wayside coil or its associated oscillator until the wayside coil becomes energized at the frequency for which the train-carried coil is resonant. When this resonant condition occurs, however, the voltage induced in the train-carried coil causes a circulating current in such coil. The resulting transfer of power from the wayside coil to the train-carried coil, commonly referred to as a loading effect, causes a reduction of the amplitude of the oscillations provided by the oscillator 30. The result is that the amplitude of the oscillating voltage at the control grid of tube 30 is reduced and this results in a decrease of the grid bias voltage for tube 30 since, with self-bias, the bias voltage automatically adjusts itself to the value at which the grid will be driven moderately positive on the positive half cycles of the input grid voltage so that the rectified grid current that is produced will be just sufficient to provide that amount of bias voltage. As the oscillator frequency is swept past the resonant frequency of the train-carried coil, the loading effect upon the pick-up coil is rapidly reduced and the amplitude of the oscillations provided by the oscillator quickly increase toward the normal value. As the oscillations increase in amplitude, the bias voltage at the grid of tube 30 is again restored to its former more negative value. Thus, the effect produced as the oscillator frequency sweeps the resonant frequency of the train-carried coil which is in inductive relationship to the pick-up coil is a decrease in amplitude of the oscillations at the control grid of tube 30 accompanied by a decrease in bias for this tube, or, more exactly, a decrease in the negative direct-current voltage at the grid of tube 30. When the oscillator frequency is varied rapidly these changes in grid bias and amplitude of the oscillations occur abruptly when they are caused by the loading effect of a tuned coil, as has already been described. When the loading occurs as the result of the passage of a metallic object through the magnetic field of the pick-up coil, however, these changes occur at a substantially slower rate.

The reaction detector and amplifier 46 includes the diode 55, amplifier tube 56, and the diode 57. The diode 55 has its cathode connected to the control grid of oscillator tube 30, and its plate is connected through the parallel combinations of resistor 24 and condenser 58 to ground. A connection is also provided from the plate of diode 55 through condenser 59, resistor 60 and the bias battery 61 to ground. Battery 61 is shunted by condenser 62 which tends to prevent the passage of alternating currents through the battery. The amplifier tube 56 has its cathode connected to ground and its control grid is connected to the junction of condenser 59 and resistor 60. The plate of tube 56 is connected through the primary winding of the transformer 1T to the B+ voltage source. Diode 57 has its cathode and plate connected respectively across the opposite terminals of the secondary winding of transformer 1T. Resistor 63 shunts the diode 57, and the lower terminal of the transformer secondary winding is connected to (B−) so as to provide a bias voltage over bus 64 to the control grids of the various control gas tubes.

When the oscillator 44 is operating in its normal manner, a relatively large bias voltage is developed across the parallel combination of condenser 26 and resistor 39. The bias voltage at the upper terminal of resistor 39 must appear also across the series combination of diode 55 and condenser 58. With the cathode of diode 55 at a negative potential with respect to its plate, there is only a very small voltage drop across this diode so that most of the negative bias voltage at the grid of tube 30 appears also across condenser 58. The alternating voltage applied to the control grid of oscillator tube 30 has a maximum value that substantially equals the bias voltage also appearing on this grid. During the negative half-cycles of this alternating voltage, the cathode of diode 55 is driven less negative than the plate so that this diode conducts to increase the negative voltage at the upper terminal of condenser 58. On the positive half-cycles, diode 55 cannot conduct because its cathode then becomes positive with respect to the plate and condenser 58 begins to discharge through resistor 54. Consequently, the rectification provided by diode 55 tends to maintain the negative direct-current voltage at the upper terminal of condenser 58 at a substantially greater value than the bias appearing at the grid of tube 30.

Battery 61 included in the grid-cathode circuit of tube 56 provides a negative bias voltage for tube 56 so that with the grid of tube 56 negative with respect to its cathode, there can be no current flow in the grid circuit of this tube and no potential drop across resistor 60. However, the tube 56 is still conductive since the bias from battery 61 is well above the cut off of the tube. The voltage that condenser 58 is charged to must also appear across the series combination of condenser 59, resistor 60, and battery 61. Since there is no voltage drop across resistor 60, and since the voltage of battery 61 is a relatively low voltage as compared to the voltage across condenser 58, condenser 59 is charged to nearly the same voltage as appears across condenser 58.

When a loading condition is imposed upon the oscillator 44, the bias voltage at the grid of tube 30 momentarily decreases. At the same time, the decrease in amplitude of the oscillations at the grid of tube 30 causes the diode cathode to be driven less negative on the negative half-cycles of this alternating voltage. With both the bias and alternating voltages at the grid of tube 30 reduced, condenser 58 discharges through resistor 54. This resistor 54 has a relatively high value of resistance, however, so that condenser 58 discharges slowly, and the voltage across this condenser is reduced at a rather slow rate.

Condenser 59 and resistor 60 operate as a differentiating combination with respect to voltage changes occurring across condenser 58. More specifically, the combination of condenser 59 and resistor 60 is selected to have a relatively small time constant so that when the voltage across condenser 58 is changed at a rapid rate, condenser 59 can quickly charge or discharge as required and the resulting current flow through resistor 60 produces a voltage drop across this resistor which then changes the voltage at the junction of condenser 59 and resistor 60. However, when the voltage across condenser 58 changes at a slow rate, condenser 59 charges or discharges slowly also so that there is but a low value of current passing through resistor 60 and but a correspondingly small difference in potential is produced at the grid of tube 56.

The preceding description is concerned with the changes taking place when a loading condition is imposed upon the oscillator. When the loading condition upon the oscillator 44 is removed, the bias voltage and also the alternating-current oscillations at the grid of tube 30 are quickly increased to their normal value. As a result, condenser 58 again is charged to a higher value of voltage. In charging condenser 58 to a voltage that makes its upper terminal more negative, the charging current can pass through the diode. Since the diode presents only a relatively small resistance to this current, the time constant involved in the charging of this condenser is short and condenser 58, as a result, charges quickly. With the upper terminal of condenser 58 made suddenly more negative, condenser 59 also quickly charges to a more negative potential and the relatively large charging current passing through resistor 60 produces a substantial negative pulse of voltage at the grid of tube 56. The result then is that the grid voltage of tube 56 is affected only slightly when the loading condition is imposed upon the oscillator 44, but this grid is driven substantially negative when the loading condition is removed.

Under normal conditions, tube 56 is conducting current from (B+), through the primary winding of the impulse transformer 1T, plate-cathode circuit of tube 56, to ground. Thus, each time the loaded condition of the oscillator 44 is removed, the grid of tube 56 is caused to go negative to a considerable degree, approaching, if not passing, its cut off point so as to momentarily interrupt the current flow through the primary winding of the impulse transformer 1T. This change in the current flow through the impulse transformer is then used to supply an output impulse over bus 64 to the gas tubes as will be presently discussed in greater detail.

Under some conditions, another effect of oscillator loading is produced in addition to those already described. The loading of the oscillator by a tuned coil on a train may also affect to a small degree the frequency at which the oscillator operates. More specifically, the effect produced by the train-carried coil increases as the oscillator frequency approaches the resonant frequency of such coil. At that frequency of the oscillator, the impedance coupled into the oscillator circuit from the train-carried coil appreciably affects the oscillator frequency. It has been found that the oscillator then tends to oscillate for a brief interval at substantially the resonant frequency of the train-carried coil even though the tuner would ordinarily continue to shift the oscillator frequency beyond that point. Thus, when the tuner includes an electric motor, the rotor plates of condensers 32 and 33 continue to rotate with respect to the stator plates, but the oscillator frequency may tend to stay at the resonant frequency of the tuned coil on the train. This "locking" of the oscillator frequency persists only momentarily. As the condenser rotor plates continue to rotate, the difference between the resonance frequency of the oscillator tuned circuits and the train-carried coil is increased with a consequent reduction in the locking effect until, finally, the locking effect is terminated and the oscillator frequency then suddenly shifts to a value as determined by the values of the circuit components included in the oscillator. The oscillator frequency thus shifts abruptly to such new value with the result that the loading effect on the oscillator is quickly removed. This action, in causing a more rapid change in the loading effect on the oscillator aids in causing a rapid charging of condenser 58 so as to produce a pulse of higher amplitude upon the control grid of tube 56.

As already described, grid bias voltage is provided for tube 56 by battery 61. This bias voltage is preferably of such a value as to limit the plate current of tube 56 to a safe value, but still allow the tube to conduct a substantial current through the primary of transformer 1T. When the negative pulse appears at the control grid of tube 56, the normal current flow through the plate circuit of this tube is abruptly decreased causing a voltage to be induced in the secondary winding of transformer 1T. The connection with respect to the windings of this transformer 1T is such that the lower terminal of the secondary windings is made positive in response to the decrease of plate current of tube 56. This resulting positive pulse is then applied over bus 64 to the control grids of each of the control gas tubes. Rectifier 57 shunting the secondary winding of transformer 1T presents a very small impedance to pulses causing the lower terminal of this transformer's secondary winding to become negative with respect to the opposite terminal. As a result, any pulse of this negative polarity produced in the transformer secondary winding is greatly attenuated and has substantially no effect upon the various control gas tubes.

An output voltage from the oscillator 44 is obtained from the plate of tube 30 and applied through a coupling condenser 70 and through respective decoupling resistors (such as resistor 91) to the control grids of the triode tubes included in the plurality of gate amplifiers. Each gate amplifier tube, such as tube 71, has included in its grid-cathode circuit a parallel tuned circuit as typified by the tuned circuit including condenser 72 and inductance 73 in the grid circuit of tube 71. The lower terminal of each tuned circuit is connected to the (B—) potential source to provide a suitable bias potential for the respective gate amplifier tube. Each tuned circuit is resonant to a frequency corresponding to the resonant frequency of a corresponding train-carried coil. Thus, if four different coil frequencies are used, four tuned circuits must be provided in the grid circuits of a like number of gate amplifier tubes.

When the oscillator frequency is at the particular value for which a tuned circuit included in the grid circuit of a gate amplifier tube is resonant, that tuned circuit will act as a very high impedance in the grid circuit of such tube, but for all other values of oscillator frequency, such tuned circuit will act as a very low impedance. When the tuned circuit included in the grid-cathode circuit of any gate amplifier tube acts as a very low impedance, it effectively acts as a short circuit between the grid and cathode of such tube so that a suitable input voltage cannot appear between grid and cathode of that tube. Consequently, the oscillator voltage can be effective as an input driving voltage upon the grid of any gate amplifier tube only when the tuned circuit included in the grid-cathode circuit of such tube acts as a high impedance.

More specifically, whenever the oscillator frequency passes through the frequency F1 corresponding to the resonant frequency F1 of a train-carried coil, the alternating voltage from the oscillator is applied to the control grid of the associated gate amplifier tube and is superimposed upon the bias voltage that is supplied to the grid of such tube from the (B—) source of voltage. The alternating input voltage causes the tube to conduct an alternating plate current which flows through the primary of transformer 2T so that a corresponding alternating voltage is induced in the secondary winding of a transformer 2T.

The plate circuit of tube 71, for example, includes the primary winding of transformer 2T. The secondary winding of this transformer has its lower terminal connected to the (B—) potential source and the opposite terminal is connected to the plate of a vacuum tube diode 74. The cathode of this diode is connected through condenser 75 to ground, through resistor 79 to (B—), and also through a resistor 76 to the shield grid of a gas discharge tube 77. With the shield grid of gas discharge tube 77 negative with respect to the cathode because of the connection through resistor 79 to (B—), tube 77 cannot be made conductive even if its control grid-cathode potential is raised by the application of a positive pulse from the reaction detector and amplifier 46.

The voltage induced in the primary winding of transformer 2T causes a corresponding alternating voltage to be induced in the secondary winding, and this alternating voltage causes the plate of diode 74 to be driven alternately more positive and more negative. Since both the plate and the cathode of diode 74 are maintained at the same negative potential by being connected to the (B—) voltage source, this diode readily conducts on the positive half cycles of the voltage induced in the secondary winding of transformer 2T since the plate is then made more positive with respect to the cathode. As a result of this conduction, a voltage is built up across resistor 79 in opposition to the battery and condenser 75 discharges. Thus, the voltage at the upper terminal of condenser 75 becomes less negative. During the negative half-cycles of the transformer secondary voltage, the plate of the diode is driven negatively with respect to the cathode so that diode 74 becomes nonconductive, and since the resistance of 79 is fairly large, condenser 75 does not have time to recharge before the next positive half cycle. Consequently, the effect of the alternating voltage is to reduce the negative voltage at the upper terminal of condenser 75 with the result that the potential at the shield grid of gas tube 77 more nearly approaches the potential of the cathode of this tube so that this tube is readily made conductive by a positive pulse from the reaction detector and amplifier applied to its control grid over bus 64. When tube 71 no longer conducts an alternating plate current, condenser 75 again charges to the more negative voltage supplied through resistor 79 from the (B—) voltage source.

As the frequency of the oscillator 44 is varied by the tuner 45, the oscillator frequency is alternately increased and decreased over its range of variation. According to the description already given, it is the removal of the loading effect upon the oscillator which is effective to restore the grid bias on the oscillator tube to its normal value and it is this restoration of the bias voltage to which the reaction detector and amplifier 46 is responsive and which causes it to supply the distinctive output to the plurality of control gas tubes. Thus, the distinctive output is applied to the various control gas tubes as the oscillator frequency passes beyond the resonant frequency of each train-carried coil.

The distinctive signal provided by the reaction detector and amplifier merely signifies that the oscillator frequency has swept past the resonant frequency of a train-carried coil with which the pick-up coil is magnetically coupled. No indication is provided by this signal as to the resonant frequency of the train-carried coil so as to give some basis upon which to actuate the proper one of the plurality of control responsive relays. This selection is accomplished by selectively gating the control gas tubes, i. e. by momentarily decreasing the large negative voltage ordinarily applied between shield grid and cathode which prevents each gas tube from being controlled to its conductive condition, as the oscillator frequency sweeps over the resonant frequency of each train-carried coil. Thus, the application of a distinctive signal from the reaction detector and amplifier 46 to the control grid of a control gas tube while that tube has its shield grid properly gated identifies the particular train-carried coil producing the reaction.

To provide for the fact that the distinctive reaction produced by a tuned control coil may occur at somewhat different frequencies dependent upon whether the oscillator frequency is increasing or decreasing and for any other variations in the time of occurrence of the distinctive signal, it is desirable that the shield grid of each control gas tube be gated for a sufficiently long time to ensure that the occurrence of the distinctive signal will find the proper control gas tube gated. This result is accomplished by causing each tuned circuit included in the grid circuit of a gate amplifier tube to have a greater resonance bandwidth than the corresponding train-carried control coil. In this way, the oscillator signal will be effective as an input signal to each gate amplifier tube for a greater range of oscillator frequencies, resulting in a gate of longer duration for the shield grid of the corresponding thyratron.

Each control gas tube has included in its plate circuit a winding of a corresponding control responsive relay. Voltage from the (B+) source is applied through a front contact of a relay TPR whose energization circuit is shown in Fig. 3A and through the respective control responsive relay windings to the plates of the corresponding control gas tubes. A positive pulse applied to the control grid of a gas tube at the time that the potential of its shield grid is not maintained substantially negative with respect to the cathode, causes such tube to become conductive. When any selected control gas tube is controlled to a conductive condition, grid control of such tube is lost; therefore, such tube can again be made nonconductive only by the releasing of relay TPR so as to open its front contact and remove the plate voltage applied from the (B+) source. The detailed manner in which this relay TPR is controlled is shown in Fig. 3A. The embodiment of Fig. 6 wherein track circuit control is not employed shows still another means by which deenergization control of the various control gas tubes may be obtained, and this will be explained later.

Figs. 3A and 3B illustrates the relay circuit means that may be used in one embodiment of the invention. The manner of operation of the receiving equipment shown in this drawing which is involved in the operation of the control responsive relays has already been described in a general way and in detail in connection with Fig. 5. The relay circuit means of Figs. 3A and 3B is concerned with the conditioning of the apparatus prior to the passage of a train past the identity detecting point, the transfer of identity information from the control responsive relays to designation storage units, and the restoration of the apparatus to its normal condition.

When a train enters the track section in approach of the interlocking area, the normally energized track relay TR1 becomes deenergized (see Fig. 1). The closing of its back contact 80 causes the energization of the tuner 45 which is associated with the oscillator 44. Thus, if the tuner is a motor, as diagrammatically illustrated in Fig. 5, the closing of back contact 80 causes the energization and resulting operation of this motor. As a result, this tuner motor is operated only as needed so as to reduce wear of the moving parts. The closure of back contact 81 of the track relay TR1 causes the energization of a track repeater relay TPR. The picking up of this relay TPR causes its front contact 82 to be closed so that power from the (B+) source can then be applied through the upper windings of the various control responsive relays to the plates of the corresponding control gas tubes. With these control gas tubes thus energized, the passage of any selected combination of train-carried control coils 50 through the magnetic field of the fixed pick-up coil 49 causes the corresponding control responsive relays to be selectively energized as has already been described in detail.

With reference to Figs. 3A and 3B, it will be noted that a dotted rectangle extends around the receiving equipment 29 which has been described in detail with more particular reference to Fig. 5. The positioning of the control relays CR1, CR2, CR3 and CR4 selectively in accordance with the particular combination of control coils 50 which may pass the pick up or receiving coil 49 are used to control similar relays of the storage units of a typical train describer system. Generally speaking, these storage units have the information transferred to them from the control relays CR1, CR2, CR3 and CR4 during the presence of the train in the track circuit adjacent the identity detecting point. If several trains have passed the identity detecting point, the several storage units will be filled with the identities of such trains in the order in which they passed that point. As the trains pass the point at which the identity information is used, the storage unit containing the corresponding identity information is restored to normal, and the identities in the other storage units are all moved up to the next storage unit in order. In this way, the identity information is maintained in the same order that the trains pass the identity detecting point and there is always a vacant storage unit to receive the identity of the next train.

To facilitate in the disclosure of the present invention and to simplify the illustration, the storage units have merely been shown in block form in Fig. 3B, it being understood that this portion of the disclosure may comprise storage units of any suitable type but for the sake of clearness and definiteness, it is assumed that these storage units are of the type fully shown and described in the Pat. No. 2,184,702 to R. M. Phinney granted December 26, 1939, and more particularly shown in Figs. 2A, 2B and 2C of this patent.

With reference to Fig. 3B of the present case, the No. 10 designation storage unit indicated by a dotted rectangle is assumed to be the same as the corresponding unit in Fig. 2A of the Phinney patent. Thus, relays 10SD1, 10SD2, 10SD3, 10SD4, 10R and 10RP and their associated contacts are assumed to be included in the dotted rectangle of Fig. 3B; and the wire connections leading from Fig. 3A to the Fig. 3B are also to be considered as corresponding connections shown in the Phinney patent. For convenience, these connections have been given the same reference characters as found in the patent, and in certain cases where there were no reference characters for corresponding connections in the patent, new reference characters have been added. More specifically, the reference characters 132 and 133 applied to buses shown in Figs. 3A, 3B and 6 relate to corresponding buses of the Phinney patent. The reference characters 135, 159, and 182 have been applied to buses in Figs. 3A, 3B and 6, but in the patent these numbers were applied to the contacts to which these corresponding buses were connected. This use of these reference characters has been made to clearly indicate the points of connections.

Referring to Fig. 3A of this case, it will be noted that the delay bus 133 is controlled through a front contact of the track relay TR1, and is deenergized whenever a train occupies the track circuit adjacent the train identity pick up point, but is again energized as the train leaves such track section and proceeds towards the interlocking area as illustrated in Fig. 1. The energization of bus 133, occurring subsequent to the storage of a train description in one of the designation storage units, effectively isolates that storage unit so that it is fully independent and unresponsive to the registration of another train description registered in the receiving equipment. This isolation of the designation storage unit is effected by the energization of the repeater relay R (see Phinney patent) for that unit. Also, the energization of its repeater relay RP (see Phinney patent) renders the next storage unit responsive to the next train description received and registered by the receiving equipment 29.

If no train identities have previously been stored in the various designation storage units, the first identity registered upon the control responsive relays (CR1, CR2, CR3, and CR4) by a passing train is transferred to No. 1 storage unit. Successive train identities are stored in the No. 2, No. 3, etc. storage units so that with the ten storage units which have been shown by way of example, ten distinct identities can be stored at any one time. If the identity stored in the No. 1 unit is cancelled, the apparatus provides for a transfer operation, whereby the identity stored in No. 2 is transferred to the No. 1 unit, the identity stored in No. 3 is transferred to No. 2, and so on.

Visual indication means, such as indicator lamps, may be associated with one or more of the storage units as desired. Ordinarily, indicator lamps are associated with only the first few of the storage units, such as storage units Nos. 1, 2 and 3 to provide for the display of the identity of the first three trains to arrive in order at the interlocking area. In case a complete identity display is associated with only the first three storage units, then it may be considered desirable to provide a single indicator lamp with each of the remaining storage units to advise how many identities are stored at any one time. As previously mentioned, when a maximum of only three control coils are carried by the trains (but four different frequencies are used), only fourteen train identities can be given. Thus, the indicator lamps associated with the first few storage units would include only fourteen lamps. In other words, the pyramid of contacts on the designation storage relays for each unit would be the same as shown in the Fig. 2B of the Phinney patent with the exception that the indicator lamp for all storage relays energized would be omitted.

As each train passes through the track section adjacent the train identifying point and in advance of the interlocking area, one or more of the control responsive relays is energized in a manner already described, and the front contacts of these relays thus are closed. As a result, the code buses (135, 159, 160 and 182) are selectively energized through closed back contact 83 of track relay TR1, over the execution and holding bus 132, and through the front contacts of the then energized control responsive relays. If, for example, the passing train has mounted thereon three coils resonant to the proper frequencies to cause the energization of relays CR1, CR2 and CR4, front contact 84, 85 and 87 will be closed so that buses 135, 159 and 182 will then be energized. Where the designation storage units and associated apparatus located in the tower 28 (see Fig. 1) are remote from the identity detection point, these code buses may be line wires connecting the cooperating apparatus. The selective energization of these buses causes the proper train identity code to be stored in the next available one of the designation storage units. The closing of back contact 83 also causes the energization of the holding bus 132 which is then effective, as fully described in the above mentioned patent, to prevent a transfer of train identity codes during the time that track relay TR1 is dropped away as a transfer at such a time when a new identity is being registered might cause train descriptions to be erroneously stored.

When the train passes out of the track section adjacent the train identifying point, the track relay TR1 again becomes energized. Back contact 80 opens to deenergize the tuner, and the opening of back contact 81 causes the deenergization of track repeater relay TPR. As a result, front contact 82 is open to make each of the control gas tubes nonconductive and thereby causes all of the control responsive relays to be controlled to their normal nonconductive condition. The picking up of relay TR1 also causes front contact 83 to be closed so that the delay bus 133 again is energized for reasons already described.

The circuit means provided for causing the cancellation of the train identity included in the No. 1 designation storage unit includes track relay TR2 associated with the track section located at the entrance to the interlocking area (see Fig. 1). This circuit organization automatically cancels the train description stored in storage unit No. 1 as the corresponding train enters the interlocking area and causes relay TR2 to be dropped away. When track relay TR2 becomes deenergized, the closing of its back contact 240 causes the energization of repeater relay TPA (see Fig. 3B). The picking up of relay TPA causes front contact 241 to be closed so as to energize relay TPB which is a front repeater relay of relay TPA. This latter relay can also be energized by closing the push button ECB when a manual cancellation of the train identity stored in the No. 1 designation storage unit is desired. The picking up of relay TPB causes the opening of its back contact 156 which is included in a stick circuit for all of the designation storage relays included in the No. 1 designation storage unit. As a result, these relays all become deenergized and drop away, thereby effectively cancelling the train identity code stored in this unit. When front contact 243 of relay TPB is closed, a circuit is provided to energize relay TPC which is a front repeater relay of relay TPB. Consequently, this latter relay picks up and in closing its front contact 245 applies energy over conductor 88 to the stick circuits of the various designation storage relays. Thus, during the time interval between the opening of back contact 156 and before the closure of front contact 243 can pick up relay TPC and close front contact 245, the various designation storage relays in the No. 1 unit must be released.

*Modifications*

Fig. 6 together with Fig. 3B shows an alternative embodiment of this invention for use where track circuit control in approach of the interlocking area is not contemplated. The apparatus of Fig. 3B has already been described in connection with the apparatus of Fig. 3A, but this apparatus is common also to this alternative embodiment. The modifications described here are particularly useful in the event that the train-carried coils 50 are so mounted upon the trains that they pass the fixed pick-up coil one at a time. More particularly, the receiving equipment must be so adapted that it will not register a train identity as complete and cause it to be stored in a designation storage unit if, for example, the train stops at some point after one or more but not all of the train-carried coils on the train have passed the fixed pick-up coil 49.

The embodiment of the invention illustrated in Fig. 6 also includes, for the purpose of showing a specific embodiment, four control responsive relays. These relays are controlled in the same manner as the corresponding relays of the embodiment of the invention illustrated in Fig. 3A. Thus, as each train-carried coil passes the fixed pick-up coil, a particular control responsive relay is caused to be picked-up, with the particular relay selected being dependent upon the resonant frequency of that train-carried coil. In addition, a check relay CH is provided in this embodiment of the invention. This check relay is controlled by a gas discharge tube 89 which is similar to the corresponding control gas tubes included in the receiving equipment. The input to this gas tube 89 is also obtained from the reaction detector and amplifier 46. The shield grid of this gas discharge tube 89 is not controlled by a corresponding tuned circuit and gate amplifier, however, but is instead connected directly to ground as is also the cathode of this tube. The plate of this gas tube is connected through a winding of the check relay CH and through the secondary winding of a transformer T3 to ground. The primary winding of transformer T3 is energized from suitable alternating-current source. Since the shield grid of this gas discharge tube 89 is not provided with a bias voltage, it is only required that the negative bias on the control grid of this tube be sufficiently lowered to permit this gas tube to become conductive. This result is accomplished whenever a tuned, train-carried coil passes the fixed pick-up coil 49, so that the reaction detector and amplifier 46 supplies a distinctive positive pulse output to the control grid of each of the control gas tubes including gas tube 89 and causing an increase in their grid voltages. As a result, gas tube 89 is made conductive whenever the frequency at which the pick-up coil is energized sweeps through the resonance frequency band of any train-carried coil which is then in an inductive relationship to the fixed pick-up coil 49. Since the plate of this control gas tube 89 is energized with alternating current, this gas tube remains in a conductive condition for only a brief interval because of the negative plate-cathode voltage resulting on alternate half-cycles of the plate voltage.

Except for trains which pas the identity detecting point at a very high speed, the oscillator frequency may sweep over its entire range several times during the time that any one of the train-carried coils is suitably coupled with the pick-up coil. The gas tube 89 will thus be made momentarily conductive each time that the oscillator frequency sweeps past the resonant frequency of such coil. When a train has a plurality of coils mounted on it and the coils are positioned to pass the pick-up coil in succession as shown in Fig. 2, the coils must be positioned close enough together to ensure that at least one of the coils will at all times be suitably coupled to the pick-up coil. In other words, the coils must be so mounted that after the first coil on the train has passed the pick-up coil, one of the train coils must be suitably coupled to the pick-up coil until the last coil passes the pick-up coil location. This precaution ensures against the possibility that a train might stop, after one or more but not all of the train-carried coils have passed the pick-up coil, in such a position that no coil is then suitably coupled to the pick-up coil and effective to make gas tube 89 conductive. Thus, the circuit organization provides that check relay CH is intermittently energized as the train coils pass the pick-up coil, and this relay is provided with sufficiently slow release characteristics to cause it to remain picked up by this intermittent energization. This relay should have quick pick-up characteristics, however, so that it will close its front contacts promptly when the first control coil passes the pick-up coil.

When the receiving equipment is in its normal condition, all of the control responsive relays are dropped away. A circuit is thus completed from (+), and through back contacts 90, 91, 92, 93, and through the winding of the gas tube control relay GTC to (−). As a result, this relay GTC is energized and has its front contact 94 closed so that plate supply voltage is applied to the various control gas tubes from (B+). As the various train-carried coils 50 pass the fixed pick-up coil 49, these control gas tubes can thus be selectively made conductive since they are supplied with the proper plate potential. Normally, the check relay is dropped away so that its repeater relay CHP is also dropped away. Consequently, a circuit is completed from (+), and through back contact 95 of relay CH and back contact 96 of relay CHP to energize the delay bus 133 for reasons which have already been described in a general manner in connection with the embodiment of Figs. 3A and 5. When the first train-carried coil passes the fixed pick-up coil 49, the check relay CH is picked up, and one of the control responsive relays, depending upon the resonant frequency of the train-carried coils, is also picked up. The front contact 97 of relay CH is then closed to provide an alternate energization circuit for the relay GTC even though the opening of one of the back contacts 90–93 of the control responsive relays then causes the opening of the normal pick-up circuit for this relay GTC. Relay GTC has suitably slow release characteristics so that it remains picked up during the interval between the opening of one of the back contacts 90–93 and the closing of final contact 97 of check relay CH. Relay GTC is, therefore, maintained in a picked up condition so that plate supply voltage from (B+) may still be applied through front contact 94. Each time that the oscillator frequency sweeps through the resonant frequency of a train-carried coil then in the magnetic field of the fixed pick-up coil, the check relay CH is momentarily energized so that it is held picked up. Consequently, its front contact 95 is closed to energize relay CHP, and the opening of back contact 95 of relay CH also deenergizes the delay bus 133. With relay CHP picked up, its front contact 98 is closed to provide still another circuit for the energization of relay GTC.

As the successive train-carried coils 50 pass the fixed pick-up coil 49, the control responsive relays are selectively energized and remain energized because the corresponding control gas tubes are held in a conductive condition after once being controlled to a conductive condition. As the last train-carried coil passes out of the field of the fixed pick-up coil, distinctive output signals from the reaction detector and amplifier are no longer applied to gas tube 89 and, as a result, the check relay CH becomes deenergized and drops away. Front contact 97 of this relay CH is opened but relay GTC remains energized through front contact 98 of relay CHP. Front contact 95 of relay CH in opening causes the deenergization of its repeater relay CHP, but this latter relay does not drop away immediately because of its slow release time as indicated by the heavy base line for the symbol designating this relay. Thus, a circuit is momentarily provided through back contact 95 of relay CH and front contact 96 of its repeater relay CHP so that selective energization of the buses 135, 159, 160 and 182 is provided dependent upon the picked up or dropped away conditions of the various control responsive relays. If, for example, only two train-carried coils have passed the fixed pick-up coil and these coils on the train are resonant to the proper frequencies to cause the picked up condition of the control responsive relays CR2 and CR4, buses 159 and 182 will be energized at this time through the closed front contacts 100 and 101 of relays CR2 and CR4, respectively. This selective energization of the various code buses causes a corresponding selective energization of respective designation storage relays in the lowest numbered designation storage unit then not storing a train identity as already described in a general manner in connection with the embodiment of Figs. 3A, 3B and 5. After a brief interval, relay CHP drops away and closes its back contact 96 so that energization of the delay bus 133 is again obtained.

The dropping away of relay CHP opens front contact 98 so as to deenergize relay GTC. After an interval to allow for the slow release time of this relay GTC, the front contact 94 opens so as to open the plate-cathode circuits of the various control responsive relays, thereby ensuring that all control gas tubes are restored to the nonconductive condition and all control responsive relays are dropped away. When all the control responsive relays do assume their dropped away conditions, a circuit is again provided through the back contact 90–93 of these relays to again cause the energization of relay GTC so that, with its front contact 94 again closed, the various control gas tubes are again conditioned to be responsive to the passage of train-carried coils past the fixed pick-up coil 49.

Having described a train describer system as one specific embodiment of the present invention, it is desired to be understood that this form is selected to facilitate in the disclosure of the invention rather than to limit the number of forms which it may assume; and, it is to be further understood that various modifications, adaptations, and alterations may be applied to the specific form shown to meet the requirements of practice without in any manner departing from the spirit or scope of the present invention.

What we claim is:

1. A system for transmitting controls between a railway vehicle and the trackway at fixed points by the inductive cooperation between control coils and the receiving coil of receiving apparatus comprising, said control coil being tuned to resonance at a particular radio frequency and moving into an inductive coupling relation with said receiving coil during movement of said vehicle, said receiving apparatus including a vacuum tube oscillator having its output delivered to said receiving coil, variable tuning means determining the output frequency of said oscillator and acting to give a frequency sweep over a band of frequencies, said frequency sweep being made in a time interval substantially less than the time of inductive coupling between said coils for operating speeds of the trains, a controlled device, and means responsive to the rate of change in loading of said oscillator for actuating said device, whereby said device is actuated when there is an abrupt change in the loading of said oscillator as the frequency in said receiving coil sweeps past the frequency to which said control coil is tuned, and is not actuated by changes in the loading of the oscillator due to extraneous objects inductively effecting said receiving coil during train movement.

2. A system for transmitting controls at fixed points between a railway vehicle and the trackway by the inductive cooperation between control coils and the receiving coil of receiving apparatus comprising, said control coil tuned to be resonant at a selected radio frequency and capable of being moved into an inductive coupling relationship with said receiving coil during movement of said vehicle, said receiving apparatus including a vacuum tube oscillator for energizing said receiving coil, tuning means for varying the output frequency of said oscillator so that said oscillator frequency sweeps over a frequency band including the resonant frequency of said control coil, said tuner and oscillator cooperating to vary said oscillator frequency over said frequency band in a time interval substantially less than the time said receiving coil and said control coil are in said inductive relationship for maximum train speeds, circuit elements included in said oscillator to provide a voltage having an amplitude depending upon the degree of loading of said oscillator by said control coil, a controlled device, means responsive to the rate of change of said voltage for actuating said device, whereby said device is actuated upon the occurrence of an abrupt change of loading of said oscillator as the frequency of energization of said receiving coil sweeps past the resonant frequency of said inductively coupled control coil, but is not affected by slower changes of the loading of said oscillator caused by extraneous objects affecting said receiving coil.

3. In a system for transmitting controls at fixed points between a train and a wayside location by inductive cooperation between control coils and the receiving coil by receiving apparatus, said control coil tuned to resonate at a selected radio frequency, means for moving said control coil relative to said receiving coil during train movement to thereby inductively couple said control and receiving coils, said receiving apparatus including a radio-frequency oscillator for energizing said receiving coil, tuning means associated with said oscillator to cause said oscillator frequency to sweep over a band of frequencies including said resonant frequency of said control coil, said tuning means and said oscillator cooperating to vary said oscillator frequency over said frequency band in a time interval considerably less than the time said receiving and control coils remain inductively coupled at maximum train speeds, a grid-cathode circuit for said oscillator including a parallel connected condenser and resistor, whereby the amplitude of the voltage developed across said resistor and condenser is dependent upon the degree of loading of said oscillator by said control coil, a controlled device, means responsive to the rate of change of said voltage for actuating said device, whereby said device is actuated by an abrupt change of loading of said oscillator as the frequency of energization of said receiving coil is swept rapidly past the resonant frequency of said control coil, but is not affected by slower changes in loading caused by extraneous objects affecting said receiving coil.

4. In a system for transmitting controls between a moving train and a wayside location by the inductive cooperation between control coils and the receiving coil of receiving apparatus, said control coil tuned to be resonant to a selected radio frequency, means for moving said control coil relative to said receiving coil during train movement to thereby inductively couple said control and receiving coils, said receiving apparatus including a radio-frequency oscillator for energizing said receiving coils, tuning means for causing the output frequency of said oscillator to sweep over a range of frequencies including the resonant frequency of said control coil, said tuner and said oscillator cooperating to vary said oscillator frequency over said frequency band in a time interval substantially less than the time said receiving coil and said control coil are in said inductive relationship for maximum train speeds, a grid-cathode circuit for said oscillator including a parallel connected condenser and resistor, whereby the amplitude of the voltage developed across said resistor and condenser is dependent upon the degree of loading of said oscillator by said control coil, an electron discharge tube, circuit means including a resistance-capacitance differentiating circuit responsive to the rate of change of said voltage for controlling the grid-cathode potential of said electron discharge tube, a controlled device actuated by said tube, whereby said device is actuated upon the occurrence of an abrupt change in loading of said oscillator as the output frequency of said oscillator is swept rapidly past the resonant frequency of said control coil but is not affected by slower changes in loading caused by extraneous objects affecting said receiving coil.

5. A system for transmitting controls between a train and a wayside location by the inductive transfer of energy between control coils and a receiving coil comprising, said control coils tuned to resonate at a particular radio frequency, means for moving said control and receiving coils into an inductive coupling relationship during train movement, a radio-frequency vacuum tube oscillator for energizing said receiving coil, variable tuning means for varying the output frequency of said oscillator over a band of frequencies including the resonant frequency of said control coil, said oscillator and said tuning means cooperating to vary the frequency of said oscillator over said frequency band in a time interval considerably less than the time said control and receiving coils are inductively coupled, an electron discharge tube, circuit means responsive to the rate of change of loading of said oscillator by said control coil for supplying a control voltage to said tube, a tuned circuit element resonant to the resonant frequency of said control coil and having the output of said oscillator applied thereto, circuit means controlled by the voltage produced across said tuned circuit element for providing a direct-current voltage as said oscillator frequency sweeps over the resonant frequency of said tuned circuit element, means governed by the contemporaneous occurrence of said direct-current voltage and said control voltage for governing the conduction of said discharge tube, a controlled device, means responsive to the conduction of said discharge tube for actuating said device, whereby said device is actuated when said oscillator output frequency sweeps past the resonant frequency of said control coil but is not actuated by changes in the loading of said oscillator caused by extraneous objects inductively affecting said receiving coil during train movement.

6. A system for transmitting controls at fixed points between a railway vehicle and a track by the inductive transfer of energy between control coils and a receiving coil of receiving apparatus comprising, said control coil being tuned to resonance at a particular radio frequency and moving into an inductive coupling relation with said receiving coil during movement of said vehicle, said receiving apparatus including a radio-frequency oscillator for energizing said receiving coil, variable tuning means for rapidly varying the output frequency of said oscillator through a frequency band including the resonant frequency of said control coil, said tuning means and said oscillator cooperating to vary said oscillator frequency over said frequency band in a time interval substantially less than the time said control and receiving coils are inductively coupled at maximum train speeds, an electron discharge tube, circuit means responsive to the rate of change of loading of said oscillator for controlling the conduction of said tube, a transformer including a primary and secondary winding and having said primary winding energized by the plate current of said tube, a controlled device, means governed by the voltage induced in the secondary winding of said transformer for actuating said device, whereby said device is actuated only by an abrupt change of loading of said oscillator producing a rapid change of said plate current, but is not actuated by slower changes in the loading of said oscillator caused by extraneous objects inductively affecting said receiving coils during train movement.

7. In a system for transmitting controls at fixed points between a railway vehicle and the trackway by the inductive cooperation between control coils and the receiving coil of receiving apparatus, said control coil tuned to be resonant at a selected radio frequency and moving into an inductive coupling relationship with said receiving coil during train movement, said receiving apparatus including a vacuum tube radio-frequency oscillator for energizing said receiving coil, variable tuning means for varying the output frequency of said oscillator over a band of frequencies including the resonant frequency of said control coil in a time interval substantially less than the time said control and receiving coils are inductively coupled for maximum train speeds, grid leak biasing means for said tube, whereby both a bias and an alternating-current voltage are provided between the grid and cathode of said tube, circuit means for rectifying said alternating-current voltage to provide a corresponding direct-current voltage, differentiating circuit means responsive to the rate of change of said bias and direct-current voltages to provide a control voltage, a controlled device, means governed by said control voltage to actuate said device, whereby said device is actuated upon the occurrence of an abrupt change of loading of said oscillator by said control coil as the output frequency of said oscillator sweeps past the resonant frequency of said control coil, but is not affected by slower changes of the loading of said oscillator caused by extraneous objects affecting said receiving coil.

8. A system for transmitting controls at fixed points between a railway vehicle and a track by the inductive cooperation between control coils and a receiving coil of receiving apparatus comprising, a plurality of control coils each tuned to a different radio frequency and moving into an inductive relationship with said receiving coil during train movement, said receiving apparatus including a radio-frequency oscillator for energizing said receiving coil, variable tuning means for rapidly varying the output frequency of said oscillator over a range of frequencies including the resonant frequencies of said control coils in a time interval substantially less than the time of inductive coupling between said control and receiving coils for maximum train speeds, circuit means providing a control voltage dependent on the rate of change of loading of said oscillator by each of said control coils as the output frequency of said oscillator sweeps past the respective resonant frequencies of said control coils, a plurality of tuned circuit elements respectively resonant to the resonance frequencies of said control coils and each having the output of said oscillator applied thereto, a plurality of controlled devices, means governed by the voltage developed across each of said tuned circuit elements and upon said control voltage for actuating a corresponding one of said controlled devices, whereby said controlled devices are selectively actuated as said oscillator frequency sweeps past the resonant frequencies of said control coils.

9. A system for transmitting controls between a train and a wayside location by the inductive cooperation between control coils and a receiving coil of receiving apparatus comprising, said control coils each tuned to resonate at a different radio frequency and moving into an inductive coupling relationship with said receiving coil during train movement, said receiving apparatus including a radio-frequency oscillator for energizing said receiving coil, variable tuning means for varying the output frequency of said oscillator over a band of frequencies including the resonant frequencies of said control coils in a time interval substantially less than the time each of said control coils is inductively coupled to said receiving coil for maximum train speeds, a plurality of gas discharge tubes, means responsive to the rate of change of loading of said oscillator by each of said control coils for providing a control voltage for said gas tubes, circuit means including tuned circuit elements each associated with a corresponding gas tube and respectively tuned to the resonance frequencies of said control coils and having the output of said oscillator applied thereto, whereby each of said gas tubes is successively provided with a gating voltage as the output frequency of said oscillator is swept past the resonant frequency of the corresponding control coil, and whereby the contemporaneous occurrence of said control voltage and said gating voltage applied to any gas tube causes said gas tube to conduct, a controlled device associated with each of said gas tubes and having its operation dependent upon the conduction of said gas tube, whereby the moving of each of said control coils into an inductive relationship with said receiving coil causes the corresponding controlled device to be actuated.

10. In a system for transmitting controls between a moving train and a wayside location by the inductive cooperation between a plurality of control coils and a receiving coil of receiving apparatus comprising, each of said control coils tuned to be resonant to a different radio frequency and moving into an inductive coupling relation with said receiving coil during train movement, said receiving apparatus including a radio-frequency oscillator for energizing said receiving coil, variable tuning means for varying the output frequency of said oscillator over a range of frequencies including the resonance frequencies of said control coils in a time interval substantially less than the time each of said control coils is inductively coupled to said receiving coil for operating speeds of said train, means responsive to the rate of change of loading of said oscillator by each of said control coils to provide a distinctive control voltage, a plurality of tuned circuit elements respectively tuned to the plurality of resonance frequencies of said control coils and having the output of said oscillator applied thereto, means associated with each tuned circuit element for rectifying the alternating-current voltage across said element to provide a direct-current gating voltage each time the output frequency of said oscillator is swept past the resonant frequency of said corresponding control coil, a gas discharge tube associated with each of said rectifying means, whereby the contemporaneous occurrence of said control voltage and said gating voltage applied to said control gas tube causes said gas tube to become conductive, a controlled device associated with each of said gas tubes, whereby the sweeping of the output frequency of said oscillator past the resonant frequency of each of said control coils causes the corresponding one of said controlled devices to be actuated.

11. A system for transmitting controls between a train and a wayside location by the inductive cooperation between train-carried control coils and a wayside receiving coil of receiving apparatus comprising, a track circuit including a normally energized track relay, said receiving coil located along said track within the confines of said track circuit, each of said control coils tuned to a different radio frequency and moving during train movement into an inductive coupling relation with said receiving coil, said receiving apparatus including a vacuum tube oscillator for energizing said receiving coil, variable tuning means for varying the output frequency of said oscillator over a frequency band including the resonance frequencies of said control coils in a time interval substantially less than the time each of said control coils is inductively coupled to said receiving coil for maximum train speeds, a gas discharge tube corresponding to each train-carried control coil, means including a tuned circuit element associated with each of said tubes and having the output of said oscillator applied thereto for providing a gating control for said gas tube as the output frequency of said oscillator is swept past the resonant frequency of said corresponding control coil, circuit means responsive to the rate of change of loading of said oscillator by each of said control coils for supplying a distinctive control voltage to said gas tubes, whereby the contemporaneous occurrence of said distinctive control voltage and said gating of said gas tube causes said gas tube to conduct, a controlled device associated with each gas tube and actuated in accordance with the conduction of said gas tube, control storage means, means governed by said track relay for transferring a control condition from said controlled devices to said storage means and for restoring said gas tubes to the normal nonconductive condition, whereby said control is transferred and said gas tubes restored to their normal conditions only after all of the control coils on a train have passed the receiving coil location.

12. In a system for transmitting controls between a train and a wayside location by the inductive cooperation between train-carried control coils and the receiving coil of receiving apparatus, each of said receiving coils tuned to a different radio frequency and moving into an inductive relationship with said receiving coil during train movement, said receiving apparatus including a radio-frequency oscillator for energizing said receiving coil, variable tuning means for varying the output frequency of said oscillator over a band of frequencies including said resonance frequencies of said control coils in a time interval substantially less than the time said control coils and receiving coil are inductively coupled at maximum train speeds, a gas discharge tube corresponding to each of said control coils, means responsive to the rate of change of loading of said oscillator by each of said control coils as the output frequency of said oscillator sweeps over the resonance frequencies of said coils to provide a control voltage for said tubes, means including a tuned circuit element associated with each of said tubes to provide a gating voltage for such tube as the output frequency of said oscillator is swept past the resonant frequency of the corresponding control coil, whereby the contemporaneous occurrence of said control voltage and said gating voltage applied to one of said gas tubes causes said gas tube to become conductive, a controlled device associated with each gas tube and capable of being actuated dependent upon the conduction of the corresponding gas tube, a check gas tube having said control voltages applied thereto and provided with an alternating-current plate voltage, a check relay controlled to an actuated condition by the intermittent conduction of said check gas tube, control storage means, means governed by said check relay for transferring a control condition from said controlled devices to said control storage means and for restoring said control gas tubes to their normal nonconductive condition, whereby said transfer of controls and said restoration of said control gas tubes is not effected until all of said control coils have passed said receiving coil.

13. In a system for transmitting information between a moving vehicle and a fixed location comprising, a control coil, a capacitor connected in series with said control coil and having such a value as to provide a resonant combination for a particular radio frequency, and receiving apparatus including a receiving coil, an electronic oscillator having its output connected to said receiving coil, a variable capacitor connected in multiple to said receiving coil, means for continuously operating said variable capacitor to tune said receiving coil and oscillator through a range of frequencies including said particular frequency, said operation of said variable capacitor being at such a rate as to scan the range of frequencies repeatedly and at a particular relatively fast rate, and circuit means connected to said oscillator responsive to the rate of change of the load effective on said receiving coil only if the rate of change is above a particular value which is slightly less than the rate of change in the load on said receiving coil during the sweep of its tuning through said particular frequency while said control coil is coupled with said receiving coil, and an electro-responsive device controlled by said circuit means to give a distinctive indication when said control coil is adjacent said receiving coil.

14. In a system for transmitting control information between a moving vehicle and a fixed location comprising, a control coil having a capacitor connected in series therewith, said capacitor being of such a value as to resonate said coil to a particular relatively high frequency, and receiving apparatus including a receiving coil, an electronic oscillator for energizing said receiving coil and having its output frequency controlled to sweep over a selected frequency range including said high frequency and circuit means connected to said oscillator responsive to the rate of change of the output of said oscillator for controlling an electro-responsive device.

15. In a train describer system for railroads, a control coil on a train, a capacitor connected in series with said control coil and having such a value as to provide a resonant circuit combination for a particular frequency, a receiving coil on the trackway, an electronic oscillator having its output connected to said receiving coil, frequency sweep control means continuously effective to vary the frequency of said oscillator through a range of frequencies including said particular frequency of said control coil, circuit means connected to said oscillator and distinctively responsive to a relatively rapid change in the load of a control coil adjacent said receiving coil, other circuit means connected to said oscillator and responsive to give a distinctive control when said oscillator sweeps through different particular frequencies within its range of frequencies, electro-responsive means controlled jointly by both said last mentioned circuit means to be actuated when a change in the load on said oscillator occurs at the same time said oscillator is sweeping through said particular frequency of its range to thereby give the identity of that particular train having said control coil, storage means responsive to said electro-responsive means to store a plurality of train identities as trains pass said receiving coil, and visual indicating means controlled by said storage means for indicating the different train identities.

16. In a train describer system for railroads, at least one control coil on each train passing a given point, each of said control coils being tuned to a particular one of a plurality of different frequencies, and each combination of coil frequencies on any particular train being characteristic of that train, a receiving coil on the trackway adjacent said given point, an electronic oscillator having its output connected to said receiving coil and being operable to repeatedly sweep through a range of frequencies including all the different frequencies to which said control coils on said trains may be tuned, sweep position indicating means connected to said oscillator and effective to indicate when said oscillator is sweeping different particular frequencies within its range, load responsive circuit means connected to said oscillator and responsive to the rate of change of the load on said oscillator to give a distinctive control each time a control coil passes said receiving coil but being unresponsive to the passage of metal objects, electro-responsive means controlled jointly by said sweep position indicating means and said load responsive circuit means to give a distinctive control for each different control coil passing said receiving coil, storage devices controlled by said electro-responsive means during the passage of each different train for storing a plurality of different train identities as given by different combinations of control coils, and indication means controlled by said storage devices.

17. In an organization for detecting the presence and character of a resonant tuned circuit within the inductive coupling range of a pick-up loop, a tuned oscillator connected to said loop antenna and having its frequency capable of being varied through a predetermined frequency spectrum, circuit means capable of varying at a constant rate the frequency of said oscillator throughout said predetermined frequency spectrum, a plurality of filter means each being responsive to a different band of frequencies and all of such filter means being connected to the output of said oscillator to give distinctive outputs as the frequency of said oscillator varies through the respective frequencies, a plurality of tuned resonant circuits movable into and out of range with said pick-up loop, frequency responsive means connected to said oscillator and loop to be responsive to abrupt changes in the frequency and loading of said oscillator but being unresponsive to the sweep variations of said oscillator frequency or to gradual changes in the loading of said oscillator, a plurality of double gated gas tubes, each being connected to receive the output of said frequency responsive means and each being connected to its respective one of said different filter means, whereby the passage of a resonant circuit for a frequency corresponding to one of said filter means causes the corresponding gas tube to be conductive, but whereby the passage of other magnetic and current conductive materials does not abruptly affect the frequency response of said oscillator, and signalling means distinctively controlled in accordance with the particular combination of gas tubes which are rendered conductive at any one time.

18. In an organization for transmitting distinctive controls, a loop antenna, a tuned oscillator connected to said loop antenna, circuit means operable to cause said oscillator to be variably tuned repeatedly to cause the frequency of said oscillator to repeatedly sweep through a predetermined frequency spectrum, a plurality of band-pass filters connected to the output of said oscillator, each of said filters covering a different band of frequencies within said frequency spectrum, an impulse detector coupled to said loop antenna and said oscillator and effective to give an output pulse each time a resonant circuit becomes inductively coupled with said loop antenna, and circuit means distinctively controlled each time said impulse detector gives an output coincident with the frequency sweep of said oscillator through the frequencies included within the band of any one of said band-pass filters.

19. In an organization for transmitting controls between a moving train and a fixed point comprising a loop antenna, a tuned oscillator connected to include said loop antenna as a part of its tuned grid and plate circuits, circuit means operable to cause the tuning of said oscillator to scan over a range of frequencies at repeated intervals, an impulse detector connected to said oscillator to be responsive to any abrupt change in the loading of said oscillator due to the presence of a resonant tuned circuit adjacent said loop antenna for causing a distinctive output each time the frequency of said oscillator sweeps past the front frequency of said tuned circuit, and signalling means controlled by the output of said impulse detector.

20. A system for transmitting controls between a railway vehicle and the trackway at fixed points through inductive cooperation between control coils and a receiving coil associated with receiving apparatus comprising, each of said control coils resonated to a selected frequency and positioned so as to come into inductive coupling relationship with said receiving coil during train movement, said receiving apparatus comprising an electron tube oscillator supplying its output to said receiving coil, variable tuning means associated with said oscillator and effective to cause the output frequency of said oscillator to sweep repeatedly over a predetermined frequency range including the resonant frequencies of said control coils, each frequency sweep of said oscillator over said range being made in an interval substantially less than the time of inductive coupling of said control and receiving coils, a controlled device, and means responsive to the loading effect produced on said oscillator when the output frequency of said oscillator sweeps over the resonant frequency of a control coil inductively coupled to said receiving coil for actuating said controlled device, whereby said device is controlled to a distinctive condition each time said control coil and receiving coil are inductively coupled together.

21. In a system for transmitting controls between a railway vehicle and the trackway at fixed points through the inductive cooperation of a control coil and a receiving coil of receiving apparatus comprising, said control coil resonated to a selected frequency and positioned to pass through an inductive coupling relationship with respect to said receiving coil during train movement, said receiving apparatus comprising an electronic oscillator supplying its output to said receiving coil, variable tuning means associated with said oscillator being effective to cause the output frequency of said oscillator to sweep repeatedly over a predetermined frequency range including the resonant frequency of said control coil, each frequency sweep of said oscillator over said range being made in an interval substantially less than the time of inductive coupling of said control and receiving coils, a controlled device, and means responsive to the loading effect produced on said oscillator when the output frequency of said oscillator sweeps over the resonant frequency of said control coil inductively coupled to said receiving coil for actuating said controlled device, whereby said device is controlled to a distinctive condition each time said control coil and receiving coil are inductively coupled together.

References Cited in the file of this patent

UNITED STATES PATENTS

| Number | Name | Date |
|---|---|---|
| 1,517,549 | Espenschied | Dec. 2, 1924 |
| 1,658,953 | Theremin | Feb. 14, 1928 |
| 1,710,499 | Lewis | Apr. 23, 1929 |
| 1,773,297 | Bossart | Aug. 19, 1930 |
| 1,797,651 | Gergacsevics et al. | Mar. 24, 1931 |
| 2,122,358 | Preston | June 28, 1938 |
| 2,184,702 | Phinney | Dec. 26, 1939 |
| 2,312,050 | Place | Feb. 23, 1943 |
| 2,421,106 | Wight et al. | May 27, 1947 |
| 2,454,387 | Baughman | Nov. 23, 1948 |
| 2,510,066 | Busignies | June 6, 1950 |
| 2,530,693 | Green | Nov. 21, 1950 |
| 2,535,162 | Rodgers | Dec. 26, 1950 |
| 2,554,056 | Peter et al. | May 22, 1951 |